United States Patent [19]

Evans

[11] Patent Number: 4,686,641

[45] Date of Patent: Aug. 11, 1987

[54] STATIC PROGRAMMABLE POWERLINE CARRIER CHANNEL TEST STRUCTURE AND METHOD

[75] Inventor: James W. Evans, Grosse Pointe Farms, Mich.

[73] Assignee: Detroit Edison Company, Detroit, Mich.

[21] Appl. No.: 713,173

[22] Filed: Mar. 18, 1985

[51] Int. Cl.⁴ .............. G05B 19/02; H04M 11/04; H04M 1/24

[52] U.S. Cl. .............. 364/580; 379/26; 340/310 A; 340/310 R; 371/22

[58] Field of Search .............. 364/580; 340/310 A, 340/310 R, 514; 375/10; 179/175.3 R, 175.3 F; 371/22

[56] References Cited

U.S. PATENT DOCUMENTS

| | | | |
|---|---|---|---|
| 3,891,838 | 6/1975 | Herr et al. | 371/22 |
| 3,950,622 | 4/1976 | Taylor | 371/22 |
| 3,965,294 | 6/1976 | Renz et al. | 375/10 |
| 4,114,141 | 9/1978 | Travis | 340/310 A |
| 4,127,816 | 11/1978 | Grosso et al. | 375/10 |
| 4,155,073 | 5/1979 | Ulch et al. | 371/22 |
| 4,174,517 | 11/1979 | Mandel | 340/310 A |
| 4,178,582 | 12/1979 | Richman | 375/10 |
| 4,247,934 | 1/1981 | Parras | 375/10 |
| 4,351,059 | 9/1982 | Gregoire et al. | 371/22 |
| 4,361,904 | 11/1982 | Matsumura | 375/10 |
| 4,363,123 | 12/1982 | Grover | 371/22 |
| 4,456,906 | 6/1984 | Roach | 371/22 |
| 4,529,979 | 7/1985 | Kusama et al. | 375/10 |
| 4,575,710 | 3/1986 | Best | 340/514 |
| 4,582,964 | 4/1986 | Pickens | 179/175.3 R |

Primary Examiner—Errol A. Krass
Assistant Examiner—Danielle Laibowitz
Attorney, Agent, or Firm—Barnes, Kisselle, Raisch, Choate, Whittemore & Hulbert

[57] ABSTRACT

Structure for and method of automatically testing an electrical transmission powerline carrier channel on a programmable basis electronically from any end of a multi-ended powerline, including an electronic control unit located at each end of the powerline for transmitting a signal over the channel for a predetermined time, and receiving signals back from the control units of the other ends of the powerline for predetermined times and determining the condition of the powerline carrier channel based on the length of time transmission is received at the end of the powerline where the transmission was initiated. Supervisory testing, resetting and test-inhibiting from a remote location as well as manual initiation of tests at a test unit remote location are also provided. A remote master test structure and method tests the electronic circuit through which a test was initiated. Power may be selectively transmitted over the carrier channel sequentially or concurrently at full and partial power under control of the control units.

5 Claims, 16 Drawing Figures

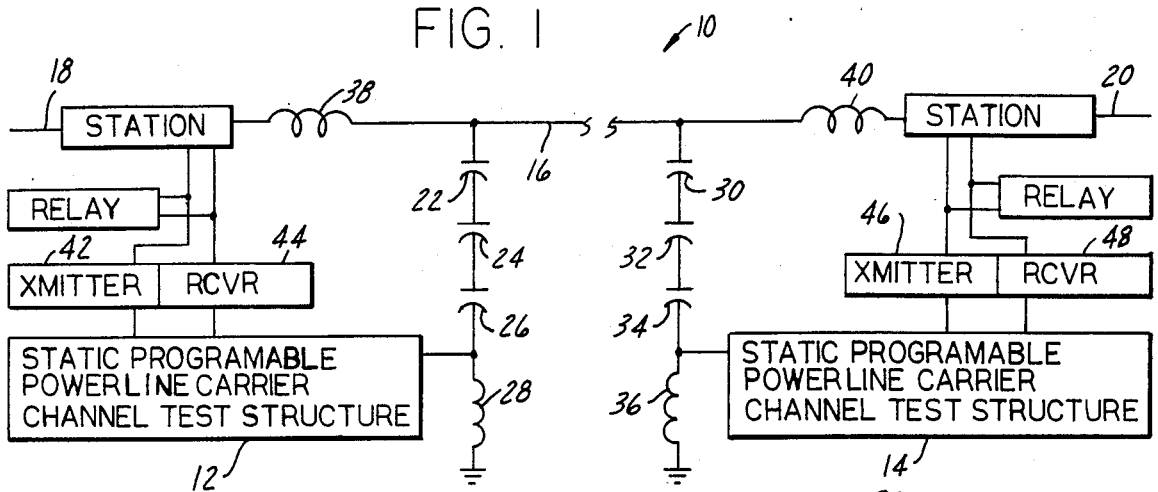
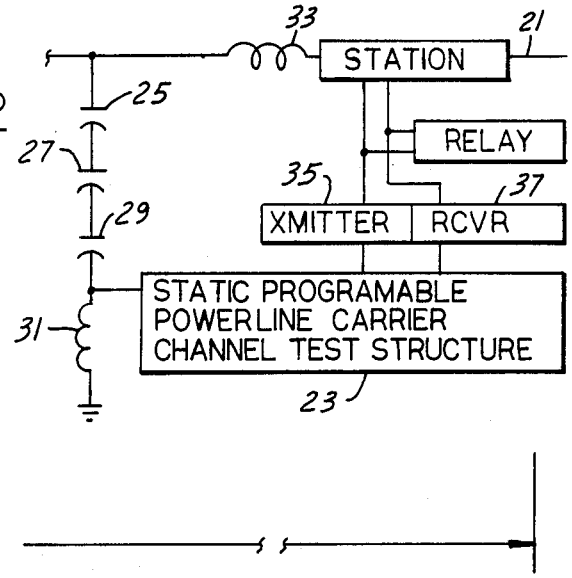
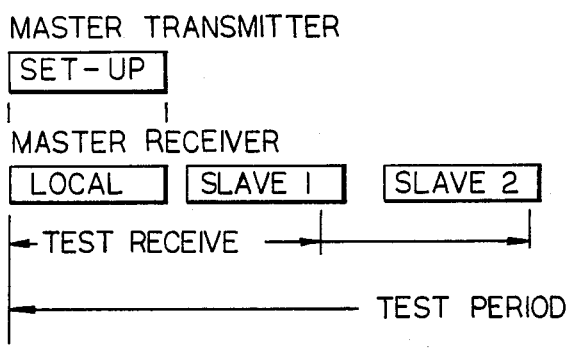
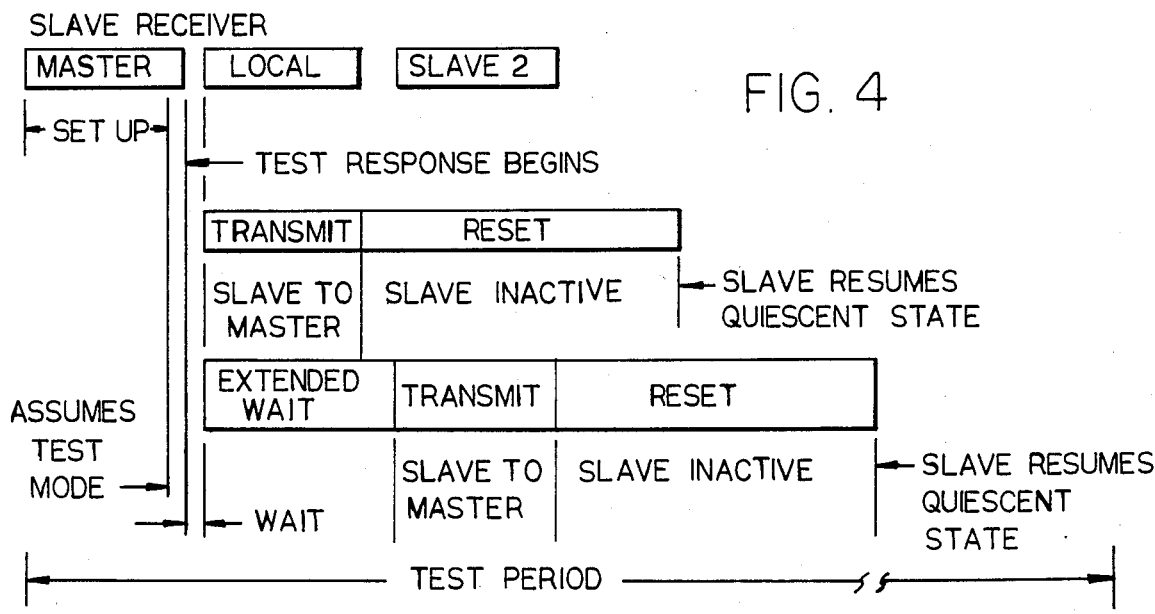

STATIC PROGRAMMABLE POWERLINE CARRIER CHANNEL TEST STRUCTURE AND METHOD

BACKGROUND OF THE INVENTION

1. Field of the Invention

The invention relates to electrical powerline carrier channel testing, and refers more specifically to an electronic programmable powerline carrier channel testing structure and method. 2.

Description of the Prior Art

In large electrical power transmission systems, such as those operated by many public utilities, serious faults and/or overloads are sensed at strategic positioned electrical power transmission stations. Such power stations typically include line terminal relays operable to automatically cut-off a powerline and/or reroute electrical energy around an overloaded or faulted powerline to facilitate continued power transmission to the extent possible. Signals between power transmission stations are carried over powerline carrier channels utilizing the powerlines themselves to convey intelligence from one station to another. In order to insure that the described automatic station operation is possible, powerline carrier channels must be periodically tested to confirm their integrity.

In the past, powerline carrier channel testing has often required the presence of personnel at both ends of a powerline between which the carrier channel test is to be effected. Where prior procedures and structures have permitted testing of a powerline carrier channel from a single location, testing has usually still required a test operator at the location, and has been effected through a plurality of mechanical contactors and the like. Such powerline carrier channel test equipment and procedures have caused many false powerline carrier channel faults to be indicated, requiring investigation of each false fault indication. Moreover, procedures for testing powerlines having more than two ends with the equipment and methods of the past have been particularly complicated, and therefore undesirable.

Manual tests performed by operators in the past have been expensive, logistically difficult, and not easily repeated on a frequent schedule. More recent automatic testing equipment, including mechanical clocks, a plurality of mechanical contacts, etc., have provided automatic testing only on a rigid schedule.

Prior art powerline carrier channel test structures have not permitted variable programming of automatic test times. Nor have they accommodated a remote supervisory control interface so that tests may be made at will from a remote location and/or manually in conjunction with but separate from scheduled automatic testing.

SUMMARY OF THE INVENTION

In accordance with the structure and method of the present invention, completely electronic programmable fully automatic means are provided for testing powerline carrier channels on multi-ended powerlines. The electronic testing structure is programmable for initiating testing automatically on a variable schedule. Testing of the powerlines may also be manually initiated at the powerline test structure, or may be initiated by supervisory control from a remote location.

In accordance with the method of the invention for testing a powerline carrier channel, a powerline carrier channel test unit is provided at each end of a multi-ended powerline and operates in conjunction with transmitter and receiver units already present at the ends of the powerline. One transmitter and its associated receiver are designated master units and the others are designated slave units. In effecting a powerline carrier channel test, the master transmitter unit is caused to transmit over the powerline carrier channel for a predetermined time. The slave receiver units receive the transmission over the powerline carrier channel and, when the master transmitter unit transmission is received by the slave receiver units, the slave transmitter units transmit back to the master receiver unit for predetermined times in sequence. Receipt by the master receiver unit of the master transmitter units transmission signal for a predetermined time, followed by the correct time of receipt of transmission from the slave transmitter units, will provide a powerline carrier channel condition indication.

Further, in accordance with the invention, all powerline test units and their associated transmitters and receivers are in a quiescent state prior to the initiation of a test. Any test unit and its associated transmitter and receiver may for any test be designated master test unit, transmitter and receiver, with the others then becoming slaves to the master.

As indicated above, the time of testing, that is the time of activating the transmitter at a selected test unit, is completely programmable to provide tests automatically at specific times during designated days. The time of test may be varied at will in accordance with the program placed in the static programmable powerline carrier channel test structure of the invention in accordance with the method of the invention. As also indicated above, the role of master is determined when a test is initiated. Tests can be initiated from any or all ends of a powerline including the structure of the invention at varying times.

In addition, the static programmable powerline carrier channel test structure and method include a number of specific features not found in previous powerline carrier channel test structures and methods. Thus, in accordance with the invention, powerlines having more than two ends may be readily tested for carrier channel reliability, operation or functionality. High power, reduced power, sequential or simultaneous transmit options are available. The test units may be externally disabled and may be locked out on occurrence of a test indicating a fault in a powerline carrier channel being tested. The master test unit may be tested from a slave unit to insure operation of the master test unit.

All test units are both master and slave. The tests may be conducted from any or all units on a programmed schedule. Master status of the test units exists only during the programmed or initiated test period. Further, the static programmable powerline carrier channel test structure of the invention is relatively simple in construction, inexpensive to manufacture and efficient in use.

BRIEF DESCRIPTION OF THE DRAWINGS

FIG. 1 is a partly schematic and partly functional diagrammatic representation of a static programmable powerline carrier channel test structure constructed in accordance with the invention.

FIG. 2 is a fragmentary diagrammatic representation of a modification of the test structure illustrated in FIG. 1.

FIG. 3 is a diagram useful in explaining the master test sequence of the powerline carrier channel test structure illustrated in FIG. 1.

FIG. 4 is a diagram useful in explaining the slave response of the powerline carrier channel test structure illustrated in FIG. 1.

FIG. 16 is a digrammatic representation of a timing module on which the timing within the carrier channel test units is based.

DESCRIPTION OF THE PREFERRED EMBODIMENT

OVERALL STRUCTURE

Figure 5:
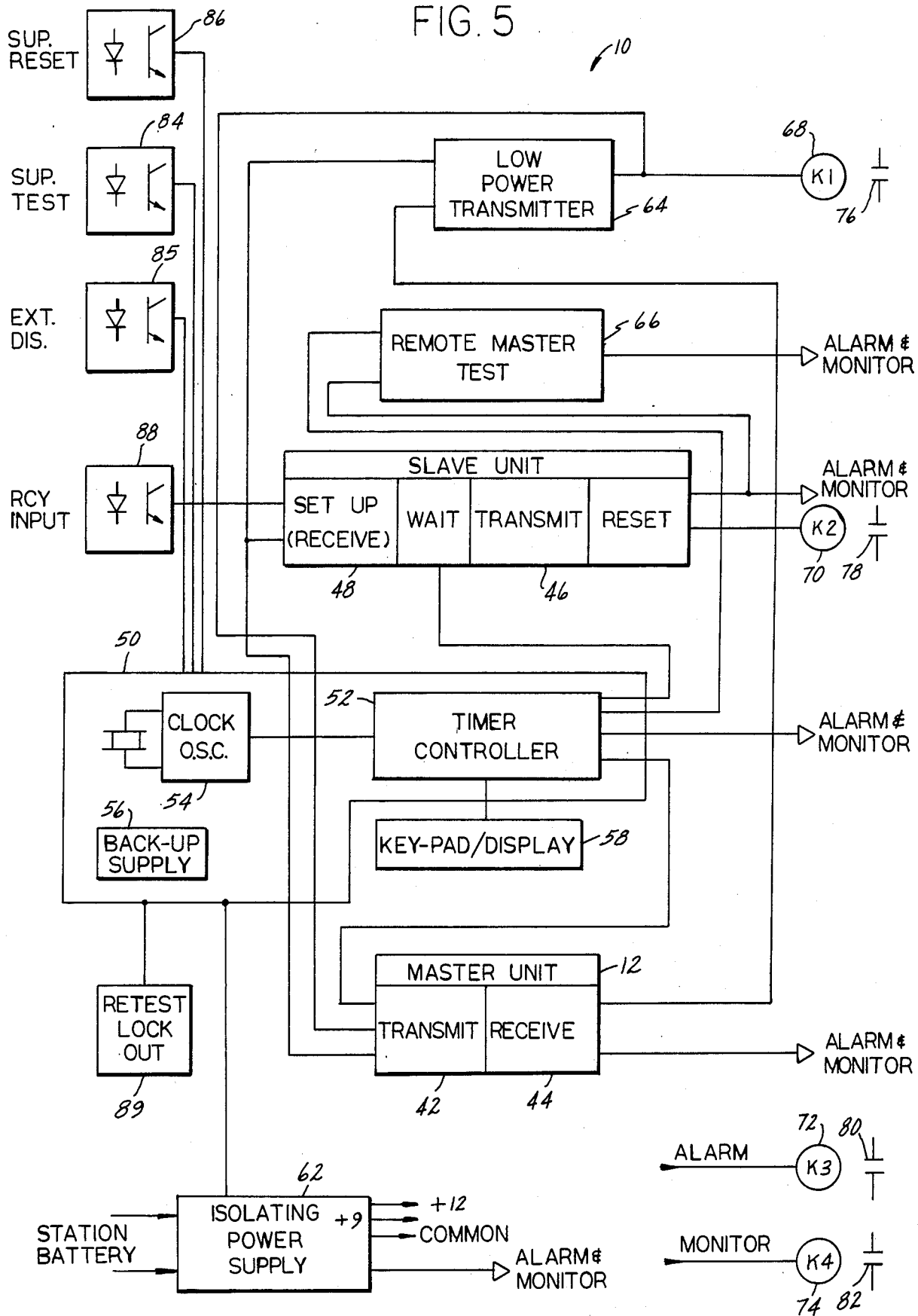
FIG. 5 is a diagram of the powerline carrier channel test structure illustrated in FIG. 1 including transmitter and receiver units which are part of existing line relaying structure and are monitored and controlled by the associated test unit to effect a channel test.

As shown best in FIG. 1, the static programmable powerline carrier channel test structure 10 of the invention includes a separate test unit 12 and 14 at each end 18, 20 of a public utility electrical transmission powerline 16. Test unit 12 is connected to end 18 of powerline 16 by the series-connected coupling capacitors 22, 24 and 26, and to ground through the drain coil 28. Corresponding coupling capacitors 30, 32 and 34 and drain coil 36 connect unit 14 at end 20. The test structure 10 in accordance with the invention also includes a wave trap 38 at line end 18 and a wave trap 40 at line end 20. Test units 12 and 14 each control a corresponding transmitter 42, 46 and a corresponding receiver 44, 48 respectively. Test unit 12 is designated a master unit, and test unit 14 is designated a slave unit for purposes of this description, although in accordance with a feature of the invention all test units may be identical and either test unit 12 or 14 may be the master unit depending only on which test unit a channel test is initiated from. Thus, the master slave relationship of test units 12 and 14 is transient in nature.

As shown best in FIG. 3, during a powerline carrier channel test in accordance with the method of the invention, transmitter 42 associated with master test unit 12 is automatically programmed to transmit an electrical signal to receiver 48 of test unit 14 over the powerline 16 between the wave traps 38, 40 at a predetermined time for a predetermined duration, indicated as SET UP time in FIG. 3. Receiver 44 associated with master test unit 12 of course also receives the local signal transmitted by transmitter 42. Subsequently, receiver 44 will receive a SLAVE 1 return signal from transmitter 46 associated with slave test unit 14 for a predetermined time duration. In accordance with the method of the invention for testing the carrier channel of powerline 16, the total time duration of receipt of transmission, that is, the time of receipt of local transmission and the time of receipt of SLAVE 1 transmission by the receiver 44 is predetermined. When the transmission receipt of time duration is at least as long as a programmed TEST RECEIVE time, the test indicates that the powerline carrier channel is operable. If receiver 44 receives transmission for less than the preprogrammed TEST RECEIVE time, the powerline carrier channel has failed the test.

Referring to FIG. 2, powerline 16 may have more than two ends, for example, a third end 21. A third test unit 23 is provided at the additional end of the powerline 16 and is coupled thereto by capacitors 25, 27 and 29 and drain coil 31. A wave trap 33 is associated therewith. Test unit 23, also designated a slave unit only for purposes of a single test, controls a transmitter 35 and a receiver 37. Where an additional test unit such as slave unit 23 is provided, transmission from transmitter 35 controlled by slave unit 23 is delayed in accordance with the method of the invention to provide receipt of the transmission from slave unit 14 and slave unit 23 sequentially, as shown in FIG. 2 by the designation SLAVE 2 following the designation SLAVE 1. An acceptable powerline test then requires transmission receipt by master receiver 44 of LOCAL, SLAVE 1 and SLAVE 2 within a predetermined lengthening TEST RECEIVE time interval. Again, an unacceptable powerline carrier channel test is indicated by transmission received by master receiver 44 of less than the programmed combined total time TEST RECEIVE.

Turning to FIG. 4, each slave unit 14, 23 monitors a corresponding receiver 48, 37 for receiving transmissions from master test unit 12, the time duration of which transmission is indicated as MASTER. Receipt of a master test transmission having a predetermined SET-UP time duration which is slightly less than the nominal SET-UP program transmission time of master transmitter 42, will set-up transmitter 46 controlled by slave unit 14. That is, upon receipt of a transmission from master test unit 12 for a predetermined time, transmitter 46 controlled by the slave unit 14 is conditioned to transmit after short period of WAIT time which allows the electronics of the channel equipment connecting master test unit 12 and slave test unit 14 to settle. After the programmed WAIT time, transmitter 46 controlled by slave test unit 14 transmits the SLAVE 1 (FIG. 3) signal back to master test unit 12. Following the SLAVE 1 response TRANSMIT time (FIG. 4) of transmitter 46, a RESET time is provided, during the slave test unit 14 is inactive. When transmission line 16 has more than two ends (FIG. 2), an EXTENDED WAIT time (FIG. 4) is programmed into second slave unit 23, whereby the transmit time from transmitter 35 controlled by slave unit 23 is delayed to begin after the transmit time of transmitter 46 controlled by slave unit 14, but within the total test period indicated in FIG. 4. Again a RESET time, during which the slave unit is inactive, is programmed into slave unit 23. After the last of what may be many slave units transmits its associated slave response signal and is reset, the master test unit indicates the results of the test of the powerline carrier channel in accordance with the accumulative duration of the slave response signals received by the master test unit. The slave units have assumed a quiescent state, and master unit 12 is inactive until reactivated in accordance with a predetermined program, or manually activated at master test unit 12 or from a supervisory interface from a remote location (not shown).

Referring now to FIG. 5, each test site at which a channel test structure is located is provided with an electronic control circuit 50 having timer controller 52, a clock oscillator 54 and a back-up power supply and is connected to a key pad and display circuit 58. Each test unit of the invention further includes an isolating power supply 62, a low power transmission circuit 64 and remote master test circuit 66 all related as shown best in FIG. 5. In addition, the relays 68, 70, 72 and 74 actuate associated contacts 76, 78, 80 and 82 to provide low power transmission, full power transmission and an alarm signal and to actuate monitors respectively. Output is provided from a remote master test circuit 66 in the test unit 14 designated slave, from an electronic control circuit 50 in the test unit 12 designated master, and from power supply 62 to the alarm and monitor relay solenoids 72 and 74. Supervisory reset, supervisory test, external disable and receiver input interface circuits 86, 84, 85 and 88 are also provided in the powerline carrier channel test structure 10, as shown in the diagram of FIG. 5 along with a retest lockout circuit 89.

Detailed Structural Description

Figure 6:
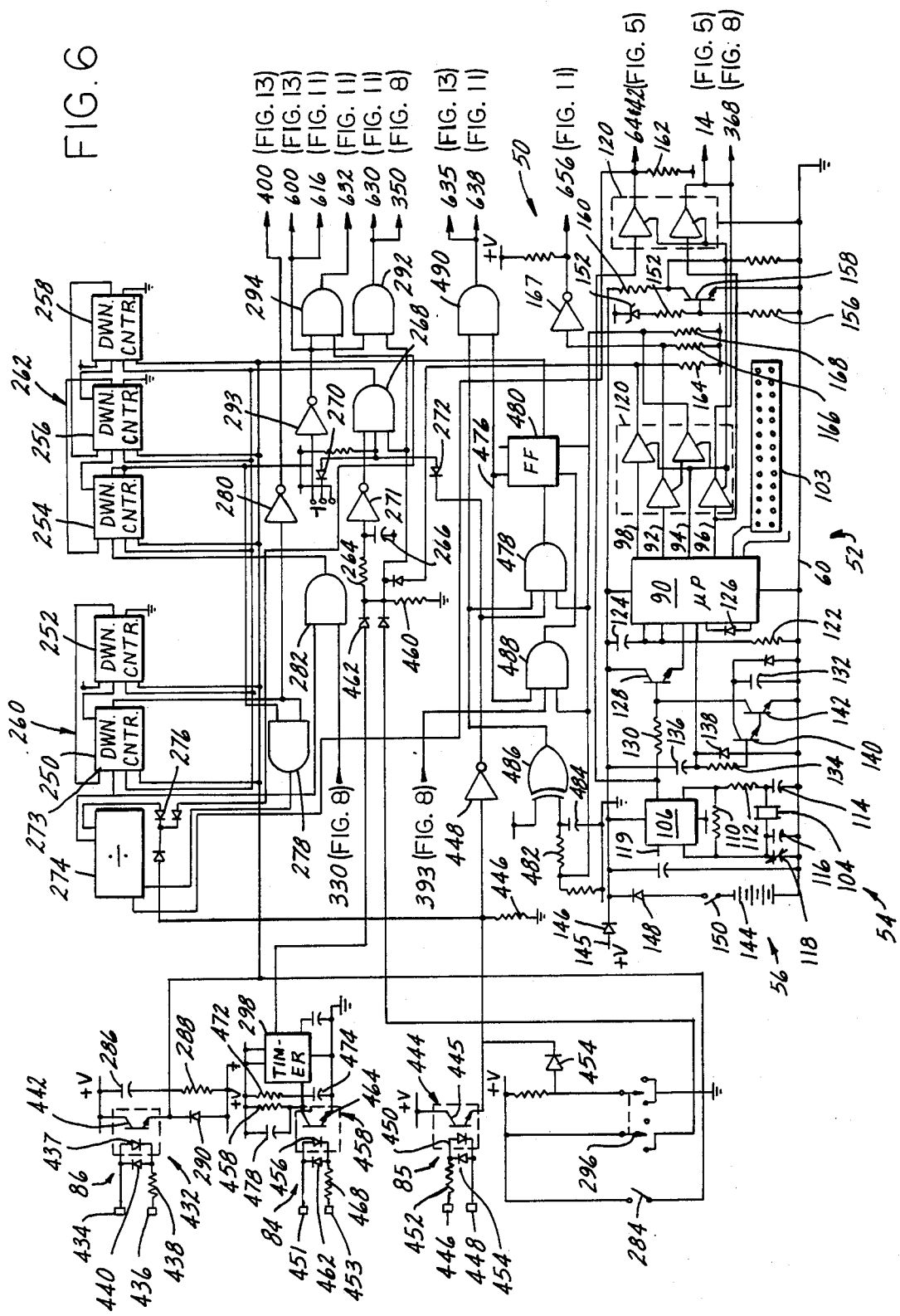
FIG. 6 is a schematic diagram of the time controller circuit of one test unit of the powerline carrier channel test structure illustrated in FIG. 1.
Figure 7:
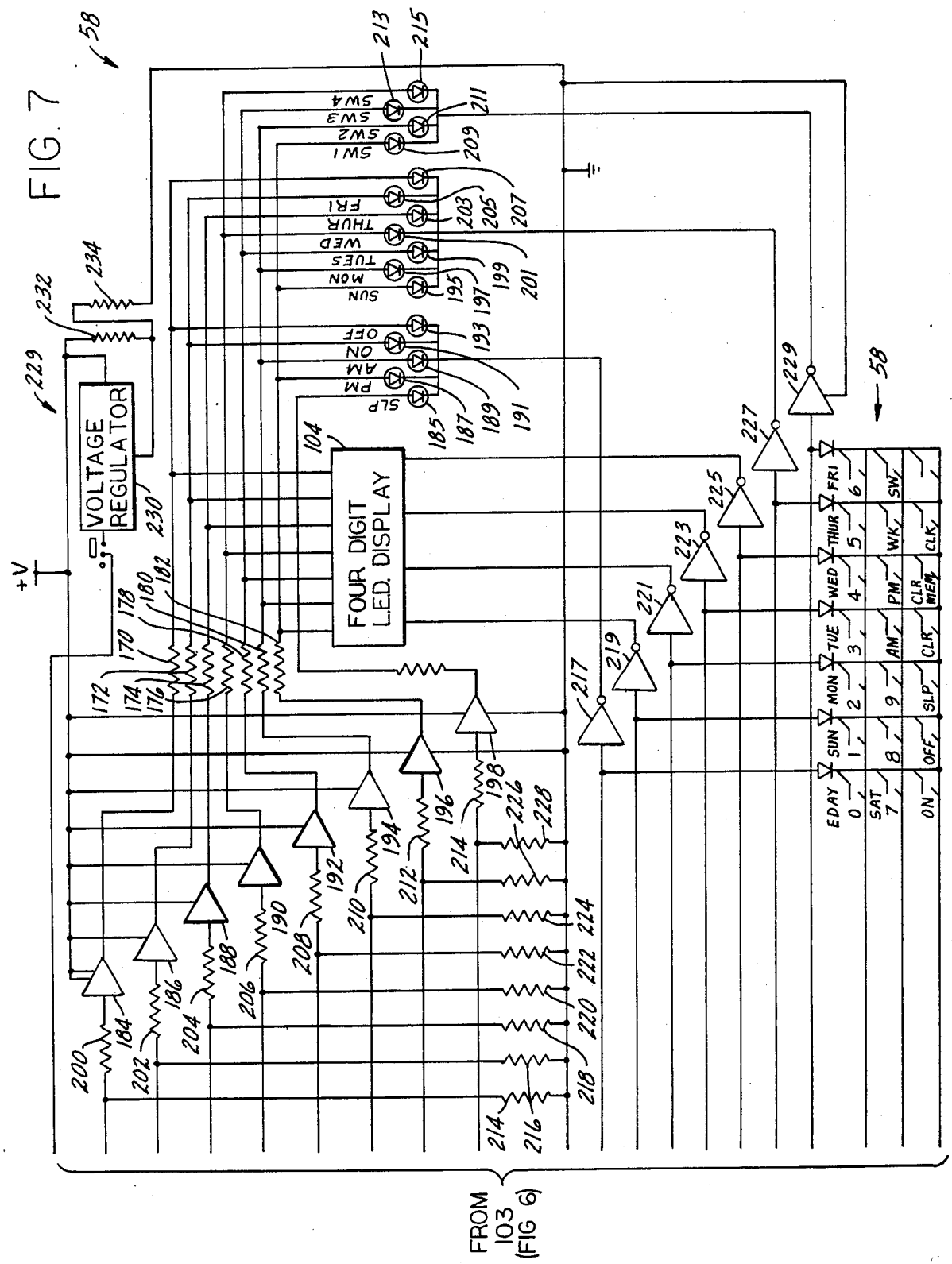
FIG. 7 is a schematic diagram of a key pad display circuit of the powerline carrier channel test unit illustrated in FIG. 5.
Figure 15:
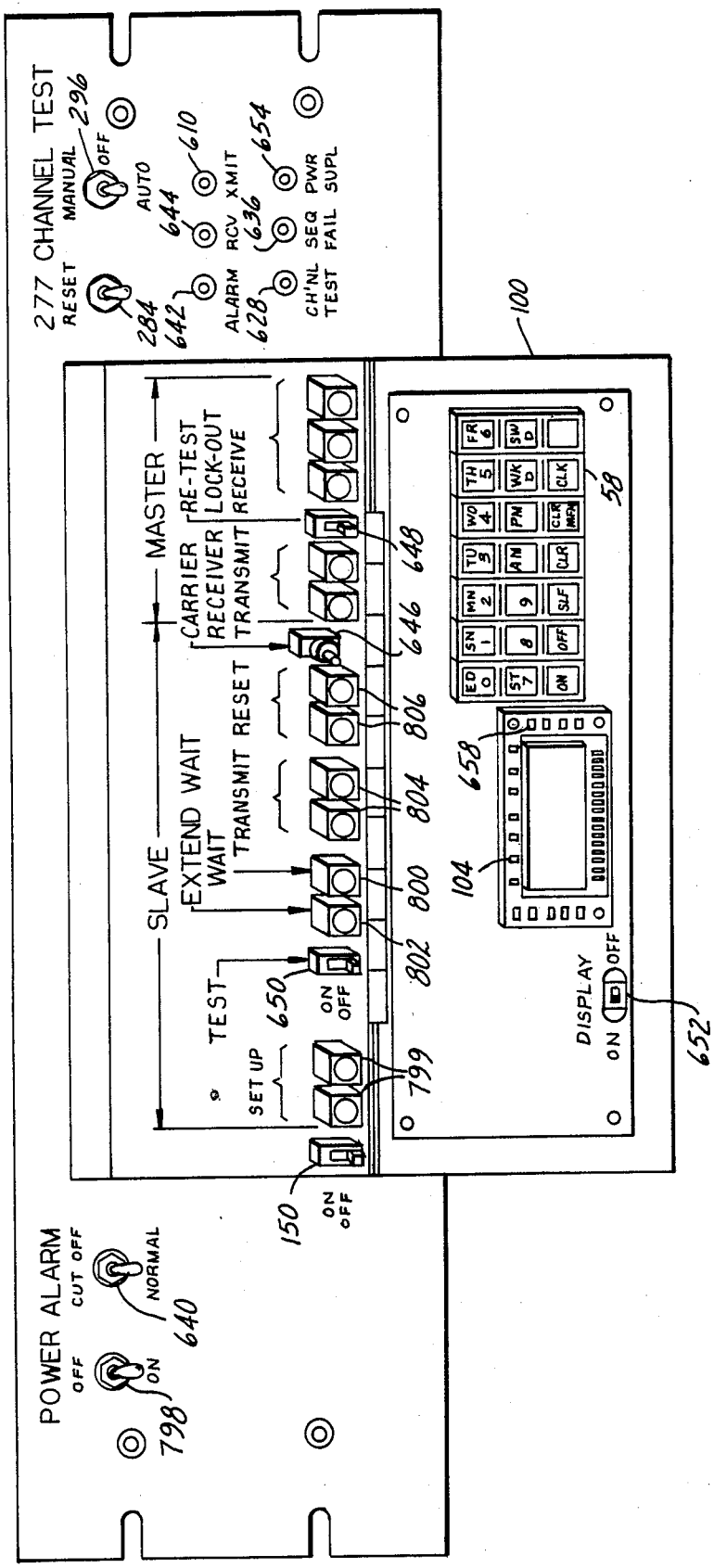
FIG. 15 is a partly pictorial, partly diagrammatic representation of one test unit of the powerline carrier channel test structure illustrated in FIG. 1.

More specifically, each of the test units 12, 14, 23, etc. of a static programmable powerline carrier channel test structure 10 of the invention includes mask-programmed microprocessor chip 90 as shown in FIG. 6 to perform time keeping chores. Microprocessor 90 functions as both as clock and a programmable controller. In one preferred embodiment of the invention, microprocessor 90 is a TMS 1121 available from Texas Instruments, Inc. as an off-the-shelf item. It performs several functions at the same time which are time keeping, control of four output lines 92, 94, 96 and 98 in accordance with a stored program, display generation and keyboard scanning. In accordance with the microprocessor fixed program as purchased, the stored program may be initiated and changed through a keyboard as considered subsequently. Microprocessor 90 is programmed from a key pad display 58 mounted on a test unit access door 100 (FIG. 15). Desired time intervals may be entered and recalled by actuation of the key pad and displayed on a seven segment LED readout; 104 (FIGS. 7 and 15). Connection to and from key pad 58 (FIGS. 7 and 15) and display 104 is through the connector 103.

Additional circuitry cooperates with microprocessor 90 to form a complete time keeping circuit 50 (FIGS. 5-6). This circuitry supplies the input needs and extends the limited output drive capability of microprocessor 90. The entire time keeping subsystem 50 is isolated from the rest of the channel test system 10 so that it may run on a back-up power source 56 including a battery 144, in the event that the channel test structure power is interrupted. Microprocessor 90 receives an external 60 Hz frequency source from oscillator 54 (FIGS. 5-6) as a time standard. An oscillator divider integrated circuit 106, which is a MM5369 available from National Semi-Conductor, Inc. in one preferred embodiment of the invention, provides this signal. Oscillator divider 106 uses a 3.57942 MHz 108 as a reference and divides this frequency down to provide the 60 Hz reference. Resistor 112 isolates the crystal and its loading capacitors 114, 116 and 118 from the oscillator output. Loading capacitors 118 is adjustable so that the oscillator frequency may be set exactly at 3.57942 MHz. This frequency is measured at test point 119 on the oscillator divider 106. The 60 Hz reference signal output of oscillator 54 is also supplied to the powerline carrier channel test structure for timing. This signal passes through the buffer 120 to achieve isolation when operating on backup power.

Several auxiliary components support the activities of the microprocessor 90. These auxiliary components include an internal clock, a 50 Hz strap, reference conditioning, power-up reset structure and structure for holding the reference clock low during power-up reset. The internal clock signal, not to be confused with the 60 Hz reference used for time keeping and previously discussed, is used internally to control instruction cycles and to scan the display and keypad. A resistor 122 and a capacitor 124 are connected to microprocessor as the frequency controlling elements. The internal clock operates at a nominal frequency of 300 kHZ. Its exact value is not critical as the microprocessor 90 may operate between 100 and 400 kHZ. A diode 126 is connected to microprocessor 90 as shown in FIG. 6 to instruct it to use 60 Hz as its reference. Without this diode 126, time keeping will be assumed to be derived from 50 Hz. One transistor 128 of a transistor array is connected in an emitter follower arrangement to isolate the time keeping reference input of a microprocessor 90 from oscillator source 54 and thereby minimize the effects of the relatively high loading of this input on the reference. Resistor 130 and capacitor 132 remove unwanted high frequency spikes and noise before the clock oscillator output is applied to the microprocessor 90 to eliminate false counting, which would cause inaccurate time keeping.

The microprocessor 90 must be reset to beginning state upon the application of power. This is accomplished by applying a high voltage or logical one to the microprocessor 90 reset input across resistor 134 and through capacitor 136 as capacitor 136 charges to the 9.4 V power bus level through resistor 134. A diode 138 across resistor 134 prevents capacitor 136 from discharging through the microprocessor 90 on power-down. The power-up timing circuit resistor 134 and capacitor 136 charge through the bases of two transistors 140 and 142 in the transistor array which are connected in a Darlington configuration. As these components charge transistors 140 and 142 turn on, clamping the 60 Hz input at the base of transistor 128 to ground, so that the reference clock (60 Hz) input to microprocessor 90 held low during power-up reset.

During normal operation, power is supplied to timer controller 52 from logic bus 145 through diode 146. If bus power is lost for any reason, power is supplied from backup power supply battery 144 through diode 148 where switch 150 is closed. Switch 150 allows the system to be powered-down for extended periods without depleting the battery 144. This allows time keeping to continue and insures retention of timed program instruction sets.

While the test system is unpowered, timer-controller 52 is isolated by buffer 120 (FIG. 6) to prevent its outputs from attempting to apply signals to unpowered logic circuit inputs, causing damage. When the disable inputs of buffer 120 are high or logical one, the buffer operates as the open circuit, thereby providing isolation. A voltage detector made up of zener diode 152, resistor 154 and resistor 156 and one transistor 158 monitors the test system power bus. If power is lost, transistor 158 turns off, allowing a logical one to appear on the disable inputs of buffer 120 through a pull-up resistor 160. All timer-controller signals pass through buffer 120. Two gates in buffer 120 are paralleled to provide extra driving capability for an EXTENDED WAIT DIP switch to be considered subsequently. Pull-down resistors 162, 164, 166 and 168 prevent buffer inputs from floating while buffer 120 is in the disable state.

Microprocessor 90 displays time and program instructions by lighting indicating light emitting diodes in a seven segment display. Although these displays appear to be continuously illuminated, they are actually multiplexed, each digit being lit in sequence. Microprocessor 90 outputs two signals in synchronism to light each digit and light emitting diode. One signal selects the digit to be lit and the other signal selects the segments within the digit which are to be lit. A seven segment format is used to illuminate decimal number in the display. FIG. 7 shows the microprocessor segment and digit selecting and driving lines. Microprocessor 90 does not have sufficient drive capability to light the display directly. High current driver amplifiers convert low energy signals to current levels required for lighting the light emitting diode segments. Segment drivers 184, 186, 188, 190, 192, 194, 196 and 198 supply current to the light emitting diodes and segments from their emitters, with current limiting resistors 170, 172, 174, 176, 178, 180 and 182 in their collectors. The microprocessor outputs which drive the segment drivers are protected from excess loading, which occurs primarily when display power is turned off, by resistors 200, 202, 204, 206, 208, 210, 212 and 214 in series with the respective segment driver inputs. Resistors 214, 216, 218, 220, 222, 224, 226 and 228 are pull-down resistors to prevent the driver inputs from floating. Power for the keypad/display 58 (FIG. 5) is derived from a +12 volt output of a DC/DC converter 229 (FIG. 7). A voltage regulator 230 regulates the +12 to +7.5 for the display. Since voltage regulator 230 is a 5.0 V output device, its ground terminal is elevated 2.5 volts above ground by a resistor divider 232 and 234 to achieve the 7.5 V output required. As shown best in FIG. 7 the circuits through the four digit light emitting diode display and the indicator diodes 185, 187, 189, 191, 193, 195, 197, 199, 201, 203, 205, 207, 209, 211, 213 and 215 for selected functions of a test unit are completed through electronic switches 217, 219, 221, 223, 225, 227 and 229 through the keypad.

Timing within the carrier channel test units is based around a timing module 236 (FIG. 16) of two or more programmable down-counters 238 and 240. Programmable down-counters 238 and 240 count positive going transitions of the signals applied to its clock input 237 backward from a preset number to zero, then on the next clock pulse resets to the value nine and continues to count backward toward zero again. Counting may be stopped at any time by applying a high voltage logical one to the inhibit input 239. The initial value from which the counter starts counting is programmed by applying a logical one to the preset enable input 241. While preset enable is often logical one, the value presented to the program inputs 243, 245, 247 and 249 in binary coded decimal format is transferred into the counter logic and appears on the outs 251, 253, 255 and 257 respectively. As long as the preset enable input remains high, this condition will continue. In the powerline carrier test units DIP switches such as switches 242, 244 provide the presetting binary code, such that setting the switch in any position 0 through 9 sets the corresponding binary code to the input of the counter to preset it to that number.

Two or more counters 238 and 240 may be connected in series or cascaded so that numbers larger than 9 may be counted down. When two counters are cascaded, the least significant digit counter 238 counts at the applied clock rate. Its output 257 which is positive going once each cycle on the 0-9 transition, is applied to the clock input 259 of the next most significant digit counter 240. This arrangement makes the least significant digit the units digit and the most significant digit the tens digit. The least significant digit counter must complete one cycle passing from 0-9 to make the next most significant digit counter decrement once. Two logic control lines 246 and 248 in the programmable down-counter module to simplify cascading. These are zero-and-carry-forward control lines. When a counter is in the zero most significant state and the carry forward input is logical one, the "0" output assumes a logical one state. These lines are combined so that the "0" output of the most significant digit counter is applied to the carry forward input of the least significant digit. On the most significant digit counter, the carry forward input is tied to a logical one signal. In this configuration, the "0" output of the least significant digit counter will be logical one when both the most significant digit and least significant digit counters are in the zero state. When the "0" output is connected to the inhibit input of the least significant digit counter, counting will stop where both counters are zero. In the master and slave units of the channel test system 10, two timing modules 260, 262 (FIG. 6) serve as a timer. Each of these timing modules operates in the manner of module 236 of FIG. 16. Timing starts when the modules are preset to the value at their inputs as set in DIP switches (not shown). The least significant digit "0" output then assumes the logical one state. The counter module then counts clock pulses applied to the clock input of the least significant digit counter until both counters reach zero. At this time, the "0" output returns to the logical one state. Several counting modules may be cascaded to form sequential timing routines by using external inhibit signals to control counting. Module 260, composed of counters 250 and 252, controls transmit time. Module 262, composed of counters 254, 256 and 258 measures receive time. When a channel test is initiated, both of the transmit and receive modules 260 and 262 (all five down counters) are preset to their input values by a short positive-going pules applied to their preset enable input. This pulse results from a MASTER test signal and its compliment, inverted in inverter 271 and delayed by a resistance/capacitance network composed of resistor 264 and capacitor 266, being ANDed together in and gate 268. The output of this gate can only be at logical one while the delayed and inverted MASTER test signal is still at logical one.

Once the counters are preset, transmit counter module 260 runs. Its clock source is a divider 274 which divides the 60 Hz clock signal from the clock oscillator 54 to generate a 10 Hz clock rate. Diode 276 resets divider 274 when it reaches state six, thereby establishing the divide-by-six modules. Counter 260 is also held in the reset state by a logical one applied to the reset line when the master test signal is absent (signal from inverter 271 is logical one) or when the system is disabled (the OFF signal is logical one). Counting is also inhibited by a logical one output of AND gate 278 to the clock inhibit input 273 when a test cycle is completed, indicated when both the transmit and receive counting modules reaching the zero state. While the transmit counter module 260 is counting down to zero, its zero output from counter 250 is a logical zero. This signal is inverted by inverter 280, which generates the master transmit signal to operate the transmit relay 70 and the transmit indicator.

The receive time counting module 262 counts toward zero only when a carrier signal is received. The clock to this counter is gated through AND gate 282 where it passes through only when the receive signal is present. While the receive counter 262 is counting toward zero, its zero output from counter 254 is logical zero. When this output is low it signifies that the test is incomplete. If it remains incomplete at the end of the test period, a channel failure has occurred. A reset signal is applied to receive counters 254, 256 and 258 to return them to zero should a test failure occur. This can be generated from the panel mounted reset switch 284 (FIGS. 6 and 15), or through the supervisory reset feature shown in FIG. 6. The reset line is also used to establish an initial reset condition on power up. Capacitor 286 (FIG. 6) applies a logical one to the rest line on power up and charges through resistor 288 to allow the reset line to return to logical zero. A 5 msec reset pulse is generated in this fashion. Diode 290 prevents capacitor 286 from discharging through the reset line on power down. Two AND gates 292, 294 provide system output annunciation, i.e. provide a channel test in progress output at gate 292 and a channel test failure output at gate 294. Each of these drive monitor and alarm points.

The length of the test period is controlled from where the test is initiated. When the timer controller initiates the test, the test remains in progress for its programmed duration, usually one minute. When manually initiated from the control panel switch 296 (FIG. 15), it remains active as long as the control switch remains in the manual position. The supervisory interface 247 (FIG. 6) initiates a test period controlled by a timer 298. One input of AND gate 268 is used to block presetting of the counters and thereby inhibit testing. This input is split with two diodes 270, 272 to block initiation if either has a logical zero at its cathode. This condition exists when the test system is disabled from any of the disable sources by diode 270, or when the retest lockout option 273 (FIG. 6) has been selected by diode 272 and the previous test failed—as indicated by the receive counter not reaching the "0" state.

The respond subsystem 300 (FIG. 8) of the test units of channel test system 10 has an operating sequence made up of four timed segments as shown in FIG. 4. These are designed around the timing module of programmable down-counters considered above. The respond set-up of a test unit begins when the receive input becomes active. This starts the SET-UP timer. When the receive input stays active for the entire duration of the SET-UP time, a respond sequence will follow. It includes three timed segments, WAIT (including EXTENDED WAIT), TRANSMIT (including low power TRANSMIT), and RESET. At the end of RESET time the system returns to a quiescent state. The respond subsystem is divided into several elements, including a receive input conditioning circuit 302, set up sequence circuit 335, respond sequence circuit 337, respond sequence circuit with reduced power output 339, and reset circuit 340. The test unit receiver input is conditioned to provide electrical isolation and debouncing. Also, several input options to accommodate the most common receiver outputs.

Figure 8:
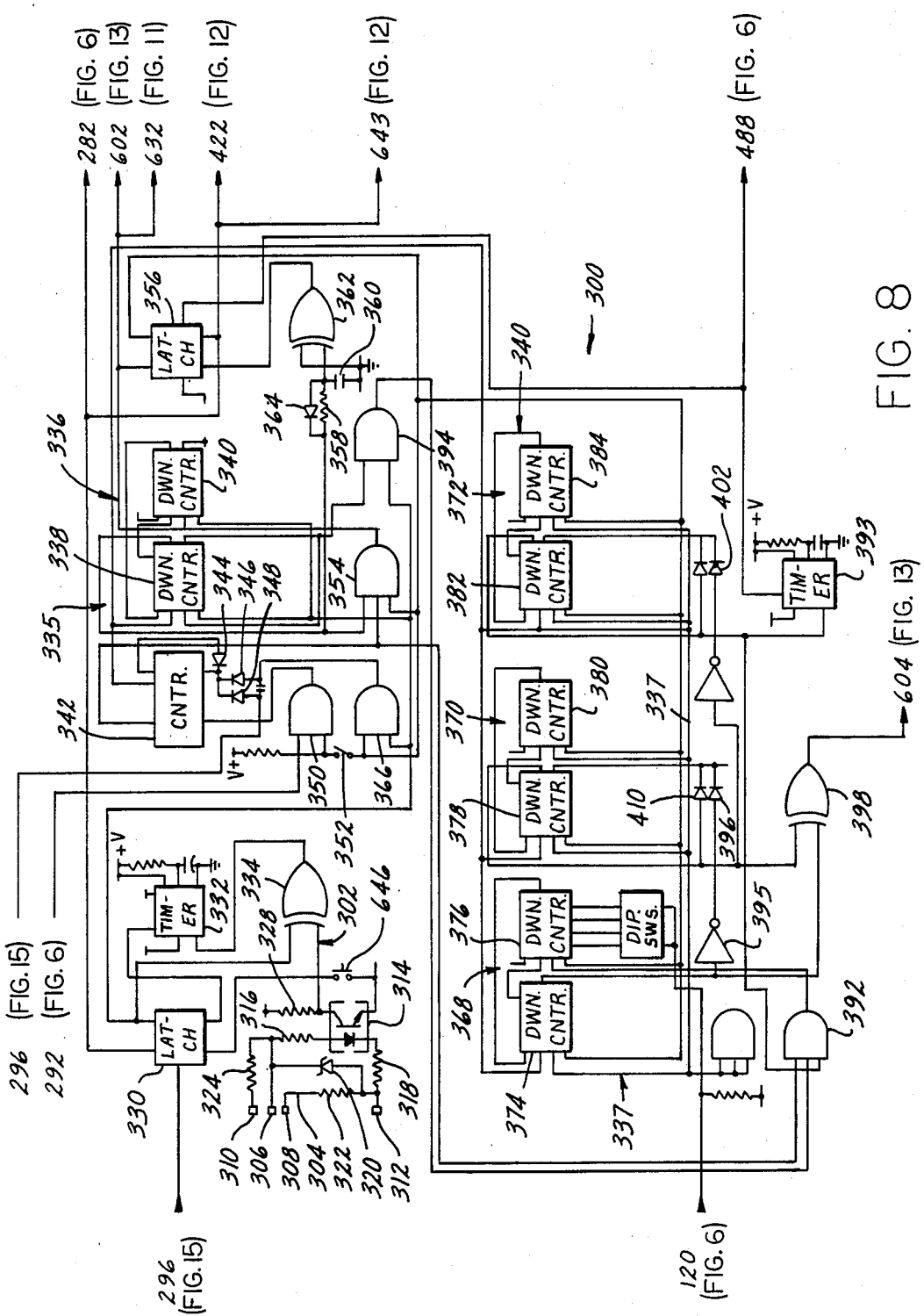
FIG. 8 is a schematic diagram of a slave subsystem of a powerline carrier channel test unit similar to that illustrated in FIG. 5.

As shown best in FIGS. 8 and 15, receiver input connections include connectors 306, 308, 310 and 312. The channel test system will operate in a receiver current loop mode using 30 ma when terminals 306 and 312 are connected for the receiver input. This current passes through an opto-isolator 314 and two current limiting resistors 316 and 318. The voltage across this combination is clamped at 3.6 V by zener diode 320. An additional resistor 322 is provided when a 300 ma current loop input is required. This option is selected by jumpering terminals 308 and 312 together. A series resistor 324 is provided when a voltage input is to be used. This resistor 324 is sized to accept 125 V DC inputs. Voltage input connections are made to terminals 310 and 312. The opto-isolator 314 converts the receiver input current to light which passes through an isolating medium and activates a phototransistor. The phototransistor coverts the light to a logic signal which operates the de-bounce logic using resistor 328 as a pull-up resistor. The opto-isolator 314 provides complete isolation between the receiver input and the test system logic.

Since the receiver input may contain noise or be initiated from an electricalmechanical contact, it must be de-bounced to prevent false starts of the test system. De-bouncing is accomplished by digital filtering. When a logic level change occurs a timer samples it 10 milliseconds later and stores it in a latch 330. A retriggerable timer integrated circuit 332 provides the time delay and strobes the latch when it times out. The timer is triggered when the input signal from opto-isolator 314 applied to Exclusive OR (EOR) gate 334 is not the same as the signal stored in latch 330. Gate 334 provides a positive going trigger for the timer 332. If another change occurs before the timer strobes the latch as from a bouncing contact, the timer is reset and must start to time from the beginning. When a received input signal is stored in the latch 330, the latch 330 provides an output signal to energize the like receiver indicator light 644 and receiver relay coil 68. This requires the signal be maintained for 10 milliseconds before the change is strobed into the latch 330. To set up a respond sequence, a carrier signal must be received continuously for a period of set-up time as set forth above. This interval is measured by a timing module 336 made up of down counters or timers 338 and 340. When a carrier is not being received, the set-up timer 338 is held in the zero state by a logical one on its master reset input. This signal emanates from latch 330. When a carrier signal is received the reset signal is removed, the down counters 338 and 340 are preset to their input number and then allowed to count toward zero. This sequence is continued using two successing SW DISP keystrokes to scroll the instructions from memory to the display. When display remains blank following the second SW DISP keystroke, the end of the stack for the selected day has been reached. Two more successive SW DISP keystrokes will bring up the first instruction in the stack again and start the scroll again.

The clock source for the set-up circuit 336, and all other timing modules in the respond subsystem, is derived by dividing the 60 Hz system clock by six. A decade counter 342, with the output fed back to its reset input, through diode 344, performs this function. The counter 342 is held in the reset state when no carrier is received by a signal applied to the transmitting by applying the master transmit signal to the counter clock 342 inhibit input through And gate 350. This prevents the test system from "setting-up" on its own transmit reset input through diode 346. The reset is also held at logical one through diode 348 when the system is disabled. The counting clock for the timing module 336 occurs when this counter is in state five. The master test unit disables counting when signal. One input of AND gate 350 is switched by switch 352 so as to allow this condition to occur for test purposes.

The SET-UP timer 366 is preset by a logical one output from AND gate 354 when a carrier signal is received. This requires three conditions, each corresponding to a logical one input to AND gate 354: the counting module 336 is in the zero state, channel test latch 356 is not set and the clock divider 342 is in state one. Once preset, the SET-UP timer module 336 counts down toward zero so long as a carrier signal is received. If the carrier signal is lost before the counter module 336 reaches the zero state, the SET-UP timer module 336 is reset to zero, the divider counter 342 resets and the system returns to the quiescent state. When the SET-UP timer module 336 reaches zero, timer 338 zero output goes to logical one and with a carrier signal still being received, latch 356 is set. The zero output of down counter 338 is delayed three msec by a resistor capacitor network including resistor 358 and capacitor 360, then shaped by the EOR gate 362 to strobe latch 356. A diode 364 across resistor 358 causes this signal to be removed without delay on presetting so as to prevent false setting of the latch. Latch 356 is strobed by time-out of set-up timer module 336 and stores the state of the carrier signal received at that time. If a carrier signal is present, it stores the logical one at its input and if absent a logical zero is stored. Once a logical one is stored, the respond subsystem will begin its sequence when the carrier signal is lost. During the period while SET-UP has occurred but a carrier signal is still present, the divider counter 342 is held in the reset state by the output of And gate 366 through diode 346. Three timing modules 368, 370 and 372 composed of down counters 374, 376, 378, 380, 382 and 384, respectively operate sequentially to make up a respond sequence. A fourth timing module 386 (FIG. 9) composed of down counters 388 and 390 is connected into the sequence when reduced power transmit is selected. Each module counts to zero, starting with the wait time module 368, and enables the next in turn. A response sequence starts when counting modules 368, 370, 372 and 386 (if present) are preset. Presetting occurs when the divider counter 342 (FIG. 8) is in state one and is controlled by AND gates 392 and 394. The preset requires the reset timer, the last of the sequences, be in the zero state (AND gate 392 is logical one); the clock divider be in state one (AND gate 392); and that a permissive from AND gate 394 be logical one. The permissive results from the carrier signal being absent (latch 330, is logical zero) and the channel test latch 356 is set. This means that preset occurs when a carrier signal from the set-up sequence has been turned off. Note that channel test latch 356 holds all the down counters in the sequence in the reset (zero) state when it is not set by applying a logical one to all reset inputs of down counters 374, 376, 378, 380, 382 and 384 and, if selected, to down counters 388 and 390. At the end of the sequence, when reset timer 382 reaches zero a timer 393 of short duration is initiated, which resets channel test latch 356. This signal also is used in the remote master test logic to be considered subsequently.

The respond sequence begins with WAIT time (FIG. 3). Timing module 368 composed of down counters 374 and 376 (FIG. 8) begins to count down from its preset value at the first clock input to down counter 374. To accomplish EXTENDED WAIT, the most significant digit down counter 376 has the source for its presetting DIP switch 375 controlled by a timer controller function S4. When this function is on, down counter 376 can be preset to any value selected by the DIP switch. When it is off down counter 376, always presets to zero. Once timing module 368 is preset, its zero output assumes the logical zero state. This is inverted by inverter 395 and blocks the counting of the transmit counter by applying logical one to the count inhibit input of down counter 378 through diode 396. When the WAIT timer reaches zero, the down counter 374 zero output blocks its own counting and applies a logical one to one input of gate 398. Since the WAIT timer is at zero and the TRANSMIT timer is preset (down counter 378 is logical zero and appears at EOR gate 398) a logical one emanates from the EOR gate 398. This operates the TRANSMIT output. TRANSMIT time is controlled by timing module 370 composed of down counters 378 and 380 shown in (FIG. 8). These two down counters operate as a timing module as described above. Once preset, the TRANSMIT timer module 370 is inhibited from counting by a logical one through diode 396 from the WAIT timer module 368. When WAIT timer module 368 expires, TRANSMIT timer module 370 is allowed to run. While TRANSMIT timer module 370 is present or counting toward zero (not in the zero state), its zero output at down counter 378 is logical zero. This is inverted by inverter 400 and is applied to the inhibit input of down counter 382 in RESET timer module 372 through diode 402. This blocks the RESET timer from counting. While the TRANSMIT and WAIT timer modules are in opposite states, i.e., WAIT time is zero and TRANSMIT timer is not, EOR gate 398 outputs a logical one, which activates the TRANSMIT output relay 70 and the TRANSMIT indicator 610 (FIG. 13) through driver amplifiers 404, 406 and 408. Once the TRANSMIT timer module 370 reaches zero it inhibits its own counting by applying the zero output from down counter 378, to its inhibit input through diode 410. Also, with both the TRANSMIT and WAIT timers in the same zero state, the output of EOR gate 398 returns to zero and deactivates the TRANSMIT output. The RESET timer module 372 inhibit signal is also removed when the TRANSMIT timer module 370 reaches zero.

Figure 9:
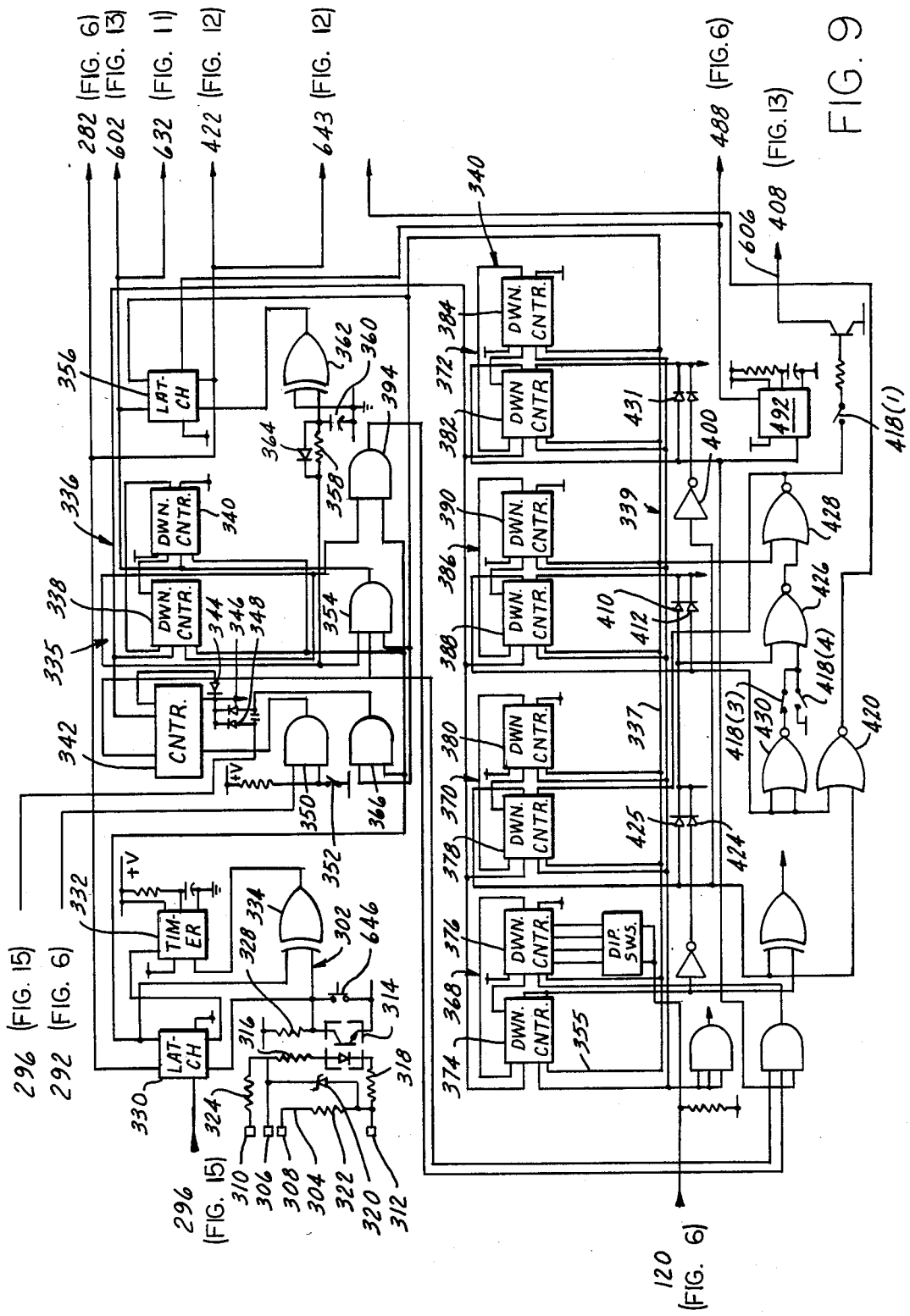
FIG. 9 is a schematic diagram of a modification to FIG. 8 for a slave subsystem with reduced power transmission capabilities for the powerline carrier channel test unit illustrated in FIG. 5.
Figure 13:
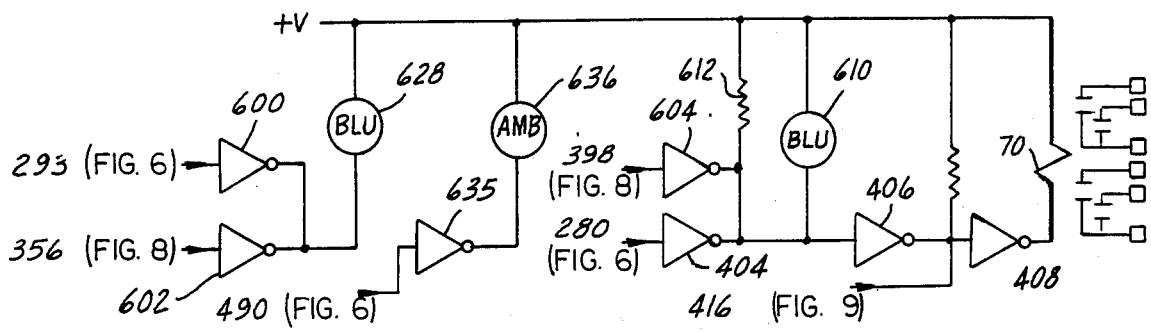
FIG. 13 is a schematic diagram of the remote master test indicator circuit of the powerline carrier channel test unit illustrated in FIG. 5, which remote master test circuit is more fully shown in FIG. 6.

As indicated above, the test units of the channel test system 10 can be equipped with a reduced power transmit option. This option is illustrated in FIG. 9, which is similar in most respects to FIG. 8. Identical elements are instituted by correspondingly identical reference numerals. When it is provided, TRANSMIT time is broken into two timed segments both composed of down counter modules. When this option is present in a test unit, the two down counters 388 and 390 are preset with the same logic which presets all other counters in the respond sequence. Timer module 386 can be strapped to run at the same time as the TRANSMIT timer module 370, coincident mode, or to run sequentially. In sequential mode, down counters 388 and 390 run first and when they reach zero, down counter 388, assumes logical one state, it stops the counting module by applying a logical one to the count inhibit through diode 412. While this counter runs, TRANSMIT timer module 370 is inhibited by a logical one from gate 428. Also, when sequential mode is selected, TRANSMIT relay 70 is held dropped out by relay drive inverter 406 (FIG. 13). Switch 418 pole 3 selects this option. In coincident mode, this circuit option is disabled by opening switch 418, pole 3. The reduced power TRANSMIT signal occurs when both the reduced power transmit and the TRANSMIT timer outputs, down counter 388 and down counter 390 respectively, are logically zero. This allows gate 420 to output a logical one to enable the reduced power transmit relay 68, through driver 422.

When the reduced power TRANSMIT timer module 386 is operating in coincident mode, control of the TRANSMIT timer module 370 requires only a permissive from the WAIT timer module 368 through diode 424 or diode 425. This signal, inverted by gate 426 when pole 3 of switch 418 is open and pole 4 of switch 418 is closed applying a signal to one input allows gate 428 to enable the TRANSMIT timer. In sequential mode with pole 3 of switch 418 closed and pole 4 open, gate 426 is enabled only when the reduced power TRANSMIT timer zero signal, inverted by gate 420 is logical zero. When TRANSMIT timer module 374 is at zero, RESET timer module 372 is enabled by a logical one applied to down counter 388. Note that, with the reduced power subassembly in place, this appears to the main logic board as though down counter 378 had reached zero as described above. Once the respond transmission has occurred, the test unit enters a period of RESET time as considered above and shown in FIG. 4. During RESET time, the test unit cannot respond to a received SET-UP signal, but it is also not active. At the end of RESET time, the test unit returns to its normal quiescent state. While TRANSMIT time module 370 is not a zero count, the RESET time module 372, composed of down counters 382 and 384 remains stopped at its preset value. Note that RESET time is preset at the same time as WAIT and TRANSMIT time. The zero output on down counter 378 inverted by inverter 400 initiates RESET timer down counter 382 by placing a logical one on the inhibit input through 402. Once TRANSMIT time reaches zero the RESET timer module 372 begins to count towards zero. When it reaches zero, it inhibits itself from its zero output down counter 382, through diode 431 to its inhibit input. This locks the entire respond subsystem up at the end of the response. Also, the zero output initiates timer 392 which resets the respond latch 356. This ends the respond sequence.

Figure 14:
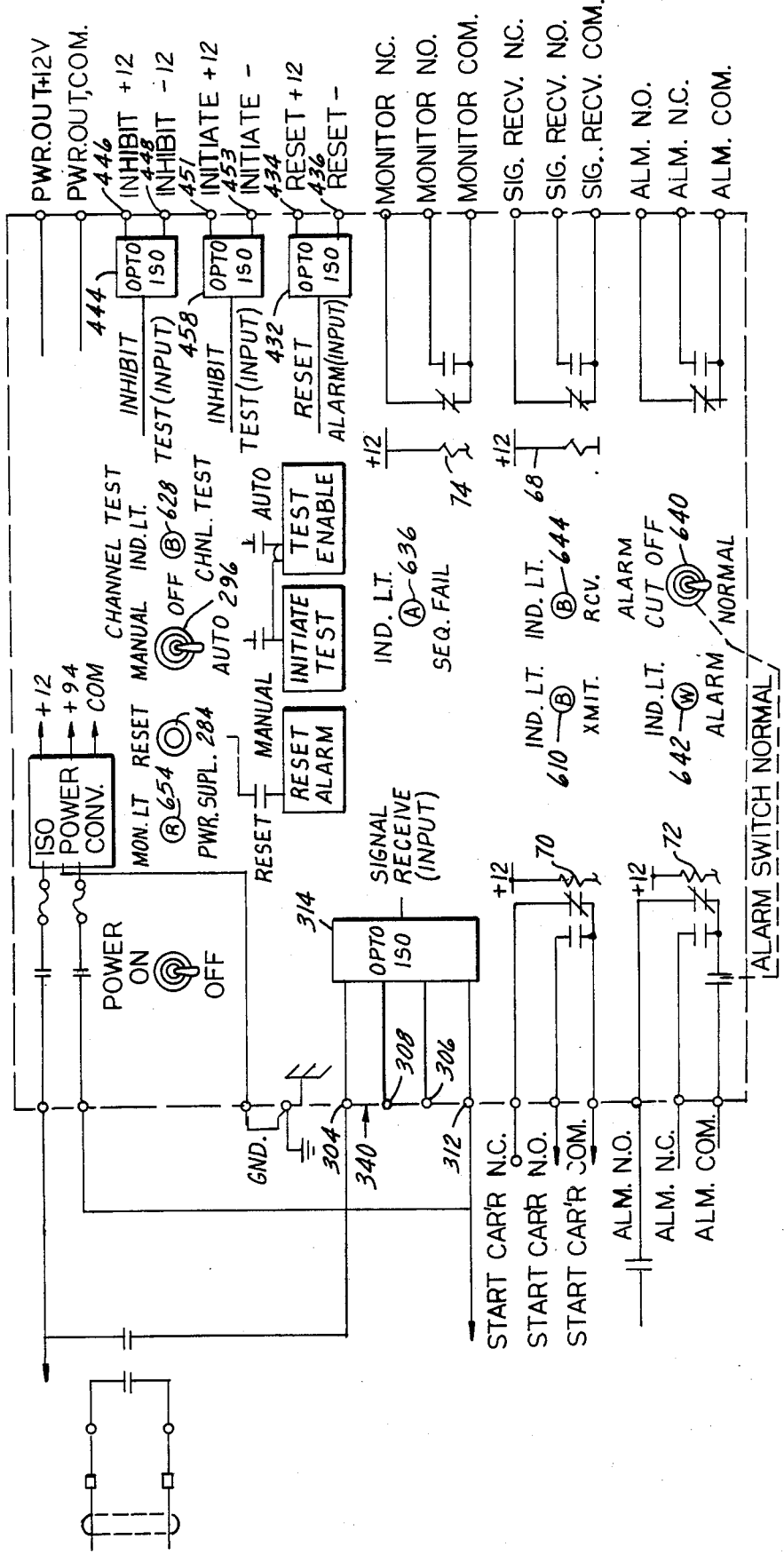
FIG. 14 is a diagrammatic representation of one test unit of the powerline carrier channel test structure illustrated in FIG. 1.

An isolating interface in the test units allows the powerline carrier channel test system to be operated remotely. There are three external control functions: reset, disable and test. To implement the reset function, an opto-isolator 432 (FIGS. 6 and 14) is provided so that system alarms, which result from automatic test operation, can be reset remotely. These alarms include master channel test fail and remote master fail system alarms. Internal alarms from power supply, lost program, etc., cannot be reset without intervention at the test unit. A control signal of 12-30 V DC applied to terminals 434 (positive) and 436 (negative) passes current through the light emitting diode 437 of opto-isolator 432. Resistor 438 (FIG. 6) limits the current and diode 440 provides reverse polarity protection for opto-isolator support. The phototransistor 442 of opto-isolator 432 switches logic bus positive to the test unit reset line across resistor 288 in parallel with panel mounted reset switch 284 (FIGS. 6, 14-15).

To implement the external disable function, an opto-isolator 444 (FIGS. 6 and 14) receives a DC control voltage of from 12 V to 30 V applied to terminals 446 (positive) and 448 (negative). Current passes through the light emitting diode 450 (FIG. 6) of opto-isolator 444. Resistor 452 limits current and diode 454 provides reverse polarity protection for the light emitting diode. The phototransistor 445 switches logic bus position to the system off logic line across resistor 446 and through inverter 448. This signal is ORed with the control signal from one contact of the panel switch 296. When the off line is positive the system is disabled. A master channel test can be initiated remotely by applying a direct current control signal to terminals 451 (positive) and 453 (negative) in the supervisory interface test circuit 455 (FIG. 6). When a 12-30 volt signal is applied current passes through the light emitting diode 456 (FIG. 6) of opto-isolator 458 (FIGS. 6 and 14). A resistor 460 limits current, and a diode 462 protects for reverse polarity. The phototransistor 464 in opto-isolator 458 triggers a timer integrated circuit 298. The trigger input of timer 298 is connected to a pull-up resistor, 458 and a capacitor 470 to prevent false triggering. The time constant to set by resistor 472 and capacitor 474 and controls the output time of the timer 298. This device is being used as a pulse stretcher. The output of timer 298 is OKed with the timer controller functions S1 and the panel switch 296 to initiate a channel test.

The powerline carrier channel test system 10 is also equipped with logic shown in FIG. 6 to detect the failure of a remotely located master test unit to initiate a scheduled test. A set of timed instructions stored in the programmable controller memory initiates and terminates a time window during which the remote master test is made. A remote master test unit test begins when an output from the microprocessor 90 occurs. This is gated through a three input AND gate 488 to clear the D-typed flip-flop 480. The master test signal is also applied to a delay network made up of a resistor 482 and a capacitor 484, and then inverted by an EOR gate 486 and in combination with the remote master test signal, produces a pulse output from AND gate 478 on a positive going edge of the remote master test signal. The third input gate 478 is connected to the output of inverter 488 to block a test operation when the test system is to be disabled. The flip-flop 480 output enables the passing of the inverted, delayed, remote master test signal at gate 486 through a two input AND gate 490. The output of gate 490 is the alarm and monitor point for remote master test fail. Once the flip-flop 490 is cleared, it can be set by strobing the flip-flop clock input while the remote master test line is still active to provide an input to flip-flop 480. This strobe comes from a 3-input AND gate 488 when the respond unit reset pulse occurs. This gate is enabled only when the flip-flop 480 has previously been cleared and the remote master test signal is active. If this strobe does not occur, then gate 490 will output a signal when the remote master test line returns to its inactive state, and an alarm results. When the flip-flop 480 is not returned to its normal set state by a respond sequence strobe and an alarm state exists, the reset line must be used to clear this condition. This clears the alarm.

Figure 10:
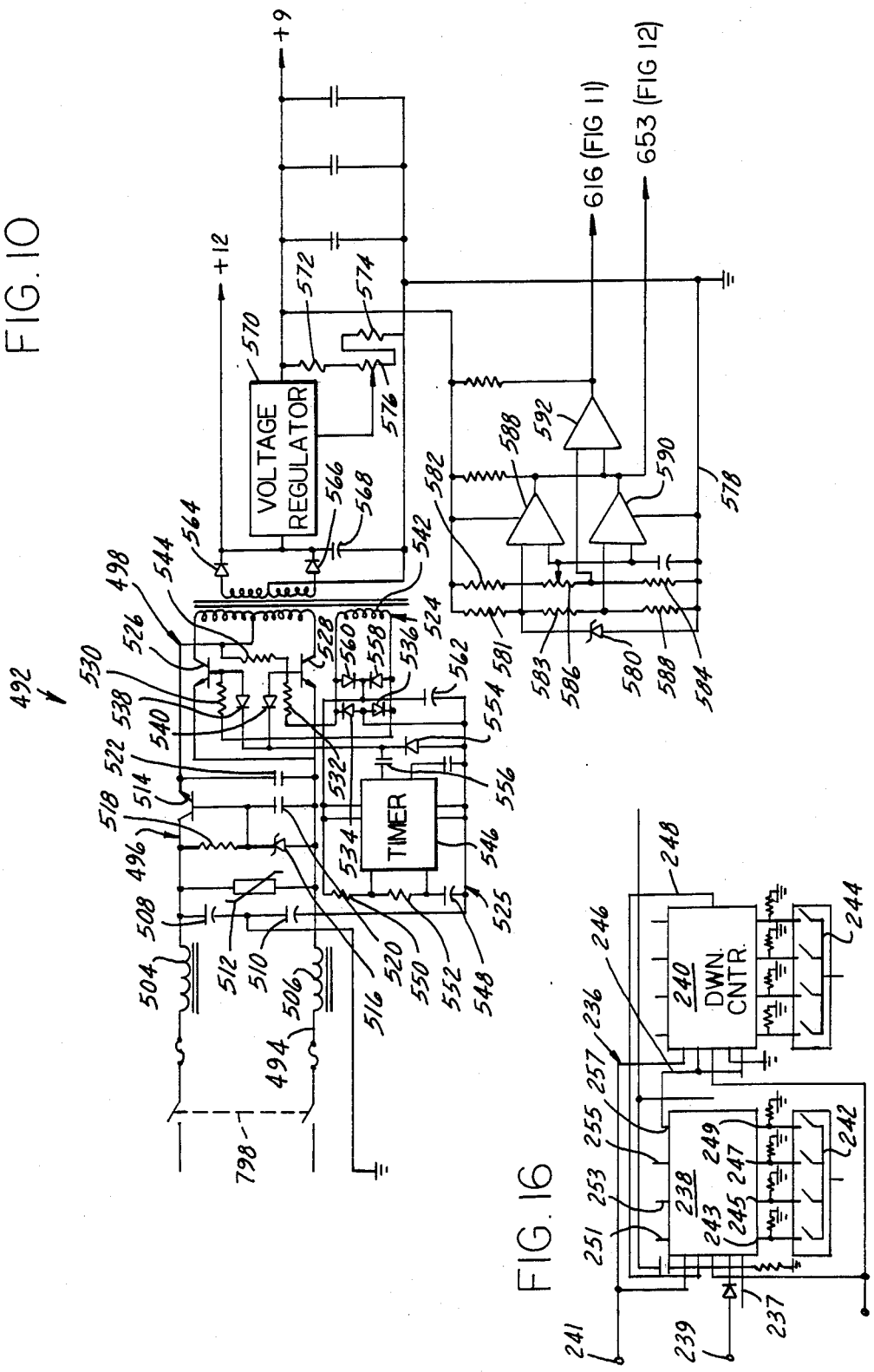
FIG. 10 is a schematic diagram of the power supply of the powerline carrier channel test uniy illustrated in FIG. 5.

A dc-to-dc power converter 442 (FIG. 10) is used in the static powerline carrier test system 10 to supply the logic and control power requirements. Converter 492 has five subsections. These are the input filter 504–512, preregulator 496, power chopper 498, oscillator-driver 522, rectifier 564, 565 and regulator 578. In addition, the logic bus voltage is monitored by a power supply alarm circuit. The 125 V direct current input is conditioned before being applied to the power supply. Two inductors 504 and 506 provide a high impedance between the battery power input (not shown) and power converter 492 to restrict battery noise from entering the converter 492 and converter noise from escaping to the battery supply. Capacitors 508 and 510 provide a low impedance path to ground for battery and converter noise. A metal oxide varistor 512 provides transient suppression for the direct current input. The series pass preregulator 496 stabilizes the voltage supply to the power chopper 498. This regulator is made up of a series pass transistor 514 and a regulating zener diode 516. The output voltage is set at 90 volts. A resistor 518 establishes current through zener diode 516 and provides base current to transistor 514. A capacitor 520 controls the turn-on rate of the voltage supply and removes noise appearing across the zener reference. Capacitor 522 decouples the output of preregulator 496.

Power conversion occurs by alternatively switching current from the preregulated voltage supply through the windings of the converter transformer 524. Chopper 526 operates in two distinctly different modes, which occur at different frequencies. During start-up, transformer 524 is allowed to saturate and thereby becomes a frequency determining element in the converters oscillation. Once fully started, the synchronizing oscillator-driver 525 takes control of the chopper, and transformer 524 no longer saturates. When operating in the saturated mode, the conversion frequency will be about 6 kHZ. Once synchronized, it operates at 13 kHZ. The non-saturating operation makes the converter more efficient and reduces switching transient currents.

Transistors 526 and 528 switch on and off alternately to chop the direct current input to the converter and create the alternating flux in the primary of transformer 524. Base drive for these transistors is provided by a feedback winding on transformer 524 phased such that, once a transistor turns on, the changing flux in transformer 524 provides base current to keep that transistor on. Transistor switching occurs when transistor 526 or 528 turns off when its base drive is cut off. The flux in transformer 524 then collapses, which reverses the polarity of the feedback winding voltage and allows the other transistor to turn on. A negative-going pulse from the driver-oscillator or saturation in the core of the transformer 524 causes turn off. In either case, the collapse of the flux in transformer 524 causes the voltage of the feedback winding to reverse polarity and thereby create base current to turn the other transistor on. Resistors 530, 532 limit the base drive current in transistors 526, 528 to safe levels. Diodes 534, 536 commute one end of the feedback winding 542 to allow the base current to alternate between transistors 526, 528. Diodes 538, 540 allow both transistors 526, 528 to be turned off simultaneously to induce switching. They are driven by the oscillator-driver. To insure start-up when direct current is applied, a resistor 544 supplies base current to transistor 528. This causes transistor 528 to turn on and thereby start oscillations in the saturating mode.

When the converter is operating in the non-saturating mode, it is synchronized to the oscillator-driver 525. This circuit uses a timing block integrated circuit 546 connected to operate as an estable multivibrator. Its periodicity is set by the resistor/capacitor network combining capacitor 548 with resistor 550, 552 to determine on time, and capacitor 548 with resistor 552 for off time. On time is adjusted for approximately 60 microseconds and the off time is set at 3 microseconds. The output level is shifted from +8 volts on and 0 volts off to 0 volts on and −8 volts off by diode 554 and capacitor 556. This signal is applied to the base of transistors 528, 526 through diodes 538, 540 respectively. When it is at −8 volts, both diodes conduct and the base current for transistors 528 and 526 is diverted from the oscillator-driver 525. This turns off transistors 528 and 526 and initiates switching. Oscillator-driver 525 will kejp the transistors off for 3 microseconds so that the flux in transformer 524 can collapse and reverse the polarity of the transfer feedback voltage. When the transistors are allowed to turn on again, they will alternate conducting.

Power for the oscillator-driver is derived from the feedback winding of transformer 524. This voltage is rectified using a full wave bridge composed of diodes 558, 560, 536 and 534. Note that diodes 536 and 534 also commute the feedback voltage to provide base drive for transistors 528, 526. Capacitor 562 is the filter capacitor for this power source. The power converter output is derived from full wave rectification of the secondary voltage of transformer 524. Diodes 564 and 566 perform this task. Capacitor 568 is a filter capacitor. The output voltage is 12 volts and supplies the control and indication needs of the test unit and inputs to a logic supply regulator. The logic supply regulator uses a single 3-terminal voltage regulator integrated circuit 570. It has a fixed output set at 5 volts; however, the supply output is regulated to 9.4 volts by elevating the regulator ground terminal above ground with divider network composed of resistors 572, 574 and potentiometer 576 which can be adjusted to fix the precise supply output. This supply feeds all internal logic of the test system.

The logic supply voltage is monitored by the circuit 578 so that an alarm may be generated if it drifts outside of acceptable bounds. A reference voltage is derived from zener diode 580 and compared at comparators 588, 548 to the logic bus voltage divided across resistors 581–586. Comparators 588 and 590 are collector ORed so that, if either assumes the conducting state (i.e. their (−) input is more positive than their (+) input). Comparator 588 detects undervoltage and comparator 590 detects overvoltage. A third comparator 592 inverts the power-out-of-bounds signal to drive the alarm and monitor system.

The powerline carrier channel test system outputs through four relays 68, 70, 72 and 74 each with two isolated C-form contacts shown in FIGS. 5, 8, 9, 11, 12 and 14. Power for the coils is derived from the +12 volt output of the converter 492. Each relay is driven from an open collection Darlington driver 422, 408, 596 and 598 (see FIGS. 8, 9, 11 and 12). Coil transient suppression diodes are provided in the driver chip. The diodes are commoned internally and returned to the +12 volt bus. A logical one on the driver input energizes the associated relay coil. Note in FIG. 14 that alarm relay 72 is normally energized for a no-alarm condition, and drops out for an alarm condition. Six indicator lamps show the status of the test unit. They are represented schematically on FIGS. 11, 12 and 13. These lamps are also driven by open collector Darlington drivers and their power source is the +12 volt bus. A logical one on the driver input turns on the associated lamps. Two drivers may be collector ORed as in the case of the channel test indicator drivers 600 and 602 and the transmit indicators drivers 404 and 604 (FIG. 13). In this case, a logical one on either driver input energizes the associated indicator.

The transmit relay driver 408 (FIG. 13) can be disable by a parallel collector input on conductor 606. This is used when the reduced power transmit option (FIG. 6) is employed. Transistor 416 (FIG. 19) clamps the input of driver 408 to ground to disable transmission. Driver 408 is connected to be driven by driver 406 connected as an inverter, which is driven by driver 604 or 404 which drive the transmit indicator 610. Resistor 612 serves as a pull-up when the transmit indicator lamp is removed from its socket. Two outputs, alarm and monitor, may be strapped to select the functions they annunciate. DIP switches 614 and 616 (FIG. 11) provide the strapping options. Two diode arrays 618 and 620 isolate the strapped inputs from each other. Because the alarm has a normally energized output relay, an inverter 622 is required to invert the logic. It also serves to drive the white alarm indicator lamp 642. A pull-up resistor 626 is provided so that the alarm remains functional should the lamp be removed from its socket.

OPERATION

In overall operation, a master test may be initiated automatically from timer controller 52 (FIGS. 5-6), may be initiated remotely using supervisory interface 455 (FIG. 6), or manually from front panel switch 296. Once a master test begins, a TRANSMIT output will occur (FIG. 3) for the duration programmed into master TRANSMIT timer 260 (FIG. 6). This period is set to exceed the slave unit SET-UP time (FIG. 4) by a suitable margin, usually 0.5 seconds. SET-UP time is determined by timer 335 (FIG. 8) and operator switch 799 (FIG. 15). The TRANSMIT signal is sent to the slave unit or units at the remote end or ends of the powerline, the carrier channel of which is being checked assuming the test state. They then transmit a return signal in turn, as programmed in their slave unit TRANSMIT timer 260. The slave respond sequence occurs when a continuous receive input is applied for a time exceeding the SET-UP time as shown in FIG. 3. Once this occurs, as signaled by the channel test indicator 628 and monitor point 634, becoming a logical one, the respond sequence will begin when the receive signal turns off.

At the beginning of the test, the master test unit receive timer 262 (FIG. 6) is pre-set to expect a carrier receiver output lasting the duration of the master TRANSMIT and slave TRANSMIT intervals. This time is set to be the sum of the master and slave TRANSMIT times less a suitable margin, usually 0.5 seconds. The receive timer only runs when the local carrier receiver output indicates a received signal, thus receive time is satisfied only when the master and slave units cause a receive output for the required duration. This time must include reduced power TRANSMIT, when this option is provided at respond units. A master test in progress is signaled by the blue channel test indicator light 628 (FIGS. 13-15) on the panel, and by a logical one on monitor point 630 (FIG. 11) until the receive timer is satisfied or the test is terminated. When testing terminates, monitor point 632 (FIG. 11) will signal a test failure should receive time not be satisfied. This condition also results in the channel test indicator 628 remaining lit. Monitor points 630 and 632 can be strapped to activate either the alarm or monitor outputs, or both, for reporting test status. The test period is usually programmed to be one minute for automatic testing initiated from the timer controller 52. It is pre-set at 20 seconds when the supervisory interface is used. When initiated manually, the test remains in progress as long as the channel test switch 296 is held in the manual position.

Master channel tests will not occur when an automatic program has not been entered in the timer controller or when testing is disabled. Several actions may disable the master test. These include: the channel test switch 296 is in the off position, an external disable is applied to input isolator 444, the retest lockout option is selected and a previous channel test failure has not been reset, and the master test function of the timer controller has not been turned off following a test. Automatic or supervisory testing requires the channel test switch 296 be in the "automatic" position. When this is satisfied, a test disable may be applied from external contacts wired to the external disable input 446, 448. This feature is provided to allow a carrier relay switch contact or other station control action to prevent automatic testing. Should a channel test failure occur, retesting of a channel either automatically, manually or via supervisory control may be blocked by using the retest lockout option. When this option is used, retesting following an unsuccessful channel test can occur only after a reset occurs. If this option is not used, a retest will occur on the next scheduled automatic test or when initiated from the supervisory interface or manually. As pointed out above, a slave response sequence (FIG. 4) consists of three pre-set timed intervals as follows: WAIT and optional EXTENDED WAIT, TRANSMIT and optional reduced power TRANSMIT, and RESET. WAIT time is provided to allow the test unit receiver outputs to settle after the master transmitter 42 turns off. It is set from programming switches 800, shown in FIG. 15. Usually a 0.5 second setting is satisfactory, but any value which allows the receivers to settle may be used. For WAIT times exceeding 0.9 seconds the EXTENDED WAIT option switch 802 (must be programmed in the timer controller). For applications on three or more ended lines having three or more ends, EXTENDED WAIT time is required to coordinate two or more respond units. As shown in FIG. 4, EXTENDED WAIT is used to delay one respond sequence while another transmits to the master receiver.

The program instructions entered in timer controller 52 allow EXTENDED WAIT to be switched in an out to suit the test schedule.

When WAIT time expires, the TRANSMIT output at the respond test units becomes active serially for the duration pre-set in the program switches 804 (FIG. 15) as TRANSMIT time. If the reduced power TRANSMIT option has been installed, TRANSMIT time is divided between full power and reduced power. The TTRANSMIT and reduced power outputs may be selected to be sequential first reduced power then TRANSMIT, or coincident where the reduced power and TRANSMIT outputs are activate simultaneously for a portion of the TRANSMIT time. Following the TRANSMIT portion of the respond sequence, a RESET period is entered during which the unit is inactive. RESET time is set using the program switches 806 in FIG. 15. The test system cannot receive a set-up command or transmit during the test period. RESET time allows other units to transmit without re-establishing or reinitiating a channel test sequence, locally and is thus required for lines having three or more ends. In these applications, the RESET time should be set to exceed the sum of the longest EXTENDED WAIT time and/or respond TRANSMIT time combination occurring in the test routine. In standard two-ended applications, RESET time only services to allow the channel to settle following a test routine. Any setting greater than 0.5 seconds is appropriate.

Figure 11:
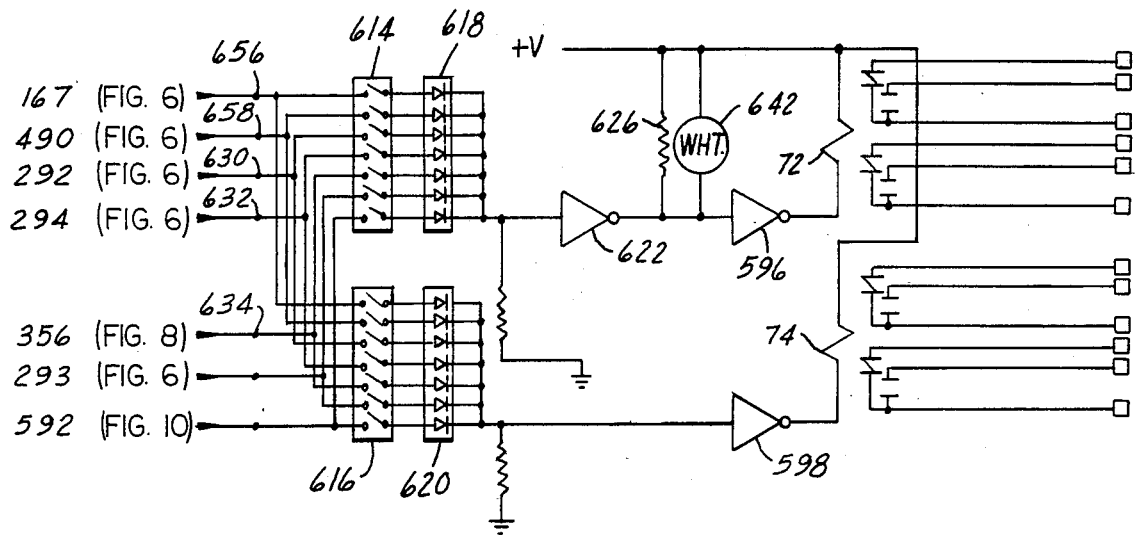
FIG. 11 is a schematic diagram of the alarm and monitor circuits of the powerline carrier channel test unit illustrated in FIG. 5.
Figure 12:
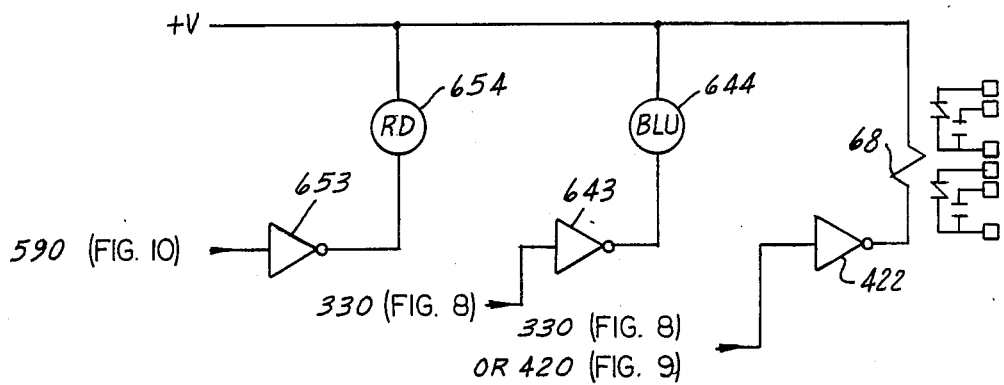
FIG. 12 is a schematic diagram of the indicators for the test inhibit circuit of the powerline carrier channel test unit illustrated in FIG. 5, which test inhibit circuit is more fully shown in FIG. 6.

The carrier channel test system 10 can be programmed to anticipate a channel test which requires a respond sequence to occur in a pre-established time window and annunciate if this does not occur on schedule. This remote master test feature is to detect the failure of the remote master test unit or local respond unit to execute a scheduled channel test. This feature is useful in that a master test unit which fails to test on schedule can be detected. The remote master test fail indication occurs at the end of the time window, as signified by the amber sequence fail indicator light 636 (FIGS. 13-15) being lit and a logical one on monitor point 638 (FIG. 11). This point may be strapped to either the alarm or monitor outputs, or both. The remote master test requires a program of on/off instructions be entered in timer controller 52 memory of the respond test unit which coordinates with the channel test program stored in the timer controller 52 of the remote master test unit. The remote master test is activated some time before the scheduled powerline carrier channel test, usually one-half hour provides a satisfactory margin. It is then sampled some time following the scheduled test. At the end of this window, the remote master test logic will annunciate if the local unit has not responded in the scheduled channel test. The remote master test can only occur when master tests are programmed, otherwise it will annunciate falsely. Remote master test failure annunciation is cleared using the rest switch or from the supervisory interface.

The powerline channel test system 10 has two independent and isolated "dry" contact outputs for annunciating various status conditions within the system. Each output has two C-form contacts. The alarm output is fail-safe in that it closes its contacts to indicate an alarm by de-energizing output relay 72 (FIG. 1). This provides alarm indication in the event of a loss of power. A panel-mounted alarm cut-off switch 640 (FIG. 15) is also provided. When the alarm is active, the white alarm indicator light 642 (FIGS. 11 and 14) on the panel also lights. To save power supply load, the monitor output is not normally energized and has no visual indicator on the panel. An active status input energizes monitor output relay 74 (FIG. 11).

Any or all of the seven internal status test points 530-634, 638 and 656 (FIG. 11) can be strapped to either the monitor or alarm output or both. This is accomplished by setting the two seven pole DIP switches 614, 616 for the alarm and monitor output respectively. In addition to the alarm and monitor outputs, a panel indicator 644 indicates received signals and may also be connected to indicate low power receives signals. These are for the convenience of the user.

As set forth above, an optional reduced power TRANSMIT feature can be provided in the respond sequence. The reduced power option also the transmitter of a test unit to be keyed at low power, then full power, during the respond TRANSMIT portion of the test cycle. Relays 68, 70 (FIGS. 12-13) provides contacts for this purpose. Two modes are available for keying the transmitter. In the sequential mode, first relay 68 then relay 70 operate for their programmed times is that low power may be initiated from relay 68 and full power from relay 70. In the coincidental mode, both relay 68 and relay 70 operate simultaneously. It is understood, however, that the reduced power time which controls relay 68 will be set to be on only for a portion of the total portion of the total TRANSMIT time set on main transmit timer 260 (FIG. 6). In the sequential mode, respond TRANSMIT time is the sum of both the reduced power and TRANSMIT timer settings.

Several user selected options detailed above, have been provided to satisfy special considerations associated with the powerline carrier channel test system 10 of the invention. Their options include backup power, carrier receive test, retest lockout, test feature and display blank. A backup power source is provided to carry the microprocessor 90 should the station battery supply be interrupted. This power is provided from a 9 volt alkaline transistor radio battery 144 (FIG. 6). It is sufficient to carry the processor 90 for seventy two hours under normal conditions. This battery should be replaced every five years or when it has been depleated by supplying power to the processor for an extended period of time. A switch 150 (FIGS. 6 and 15) disables backup power when the microprocessor is to be shut down, such as for service or shipping. A push button switch 646 (FIG. 15) may be closed to simulate a received signal to the test units. When this switch is activated the test unit will respond as if it were receiving a signal from a local carrier receiver. It is useful for testing the respond portion of the system 10. When the switch is held in for a period of time exceeding the SET-UP time setting, a respond sequence occurs. It will also operate the receive signal relay and panel indicator.

A user selectable switch 648 (FIGS. 6 and 15) allows automatic scheduled testing to proceed following a failed test. In this mode, the failure alarm will reset on the next successful test. However, when the retest lockout is activated, the test system will not perform master tests until the master test fail is manually reset. When it is off, the test system is allowed to retest on its next scheduled automatic test, or manually or through the supervisory interface. If this test is successful, the failure alarm will be returned to normal.

The channel test system has a self-diagnostic feature which may be converted switch 650 (FIG. 15) allows the system to be fully exercised from the local test unit transmitter and receiver. When the test switch 650 is activated the respond test unit will accept the SET-UP command transmitted in response to the local master test cycle. In this mode, the full test cycle can be observed using only the local test unit. When the master RECEIVE time setting and the above TRANSMIT time setting are properly coordinated (i.e. respond TRANSMIT exceeds master RECEIVE) the test system will complete the full test cycle.

A switch 652 (FIG. 15) blanks the display. When the switch is off the display will remain blank. When turned on, the display will respond to the timer controller microprocessor 90. Normally the display is left blanked when not needed to reduce power supply loading.

Six panel lights are provided to indicate the status of various system activities. The alarm indicator 642 (FIGS. 11 and 15) lights when any of the seven status points selected to alarm are active. The alarm light also accompanies the alarm relay output. The transmit indicator 610 (FIGS. 13 and 15) lights whenever the test system operates the transmit relay 70. This can originate from either the master or slave test units. The receive indicator light 644 (FIGS. 12 and 15) lights whenever a carrier channel receiver input is applied to the test unit, provided the test unit is active. No receive indication will occur when the channel test switch 296 is in the Off position or when an external disable signal has been applied. Receive indicator light 644 accompanies the receive relay 68 output. The channel test indicator light 628 (FIGS. 13 and 15) lights whenever a test unit is initiating or responding to a test. It can be activated from either the master or respond test units. When a master test cycle is incomplete (i.e. an alarm condition exists) the channel test light 628 will remain on. It is turned off when the reset switch 284 is operated. The sequence fail indicator light 636 (FIGS. 13 and 15) lights when a remote master test has failed. It is turned off by using the reset switch 284. The power supply indicator light 654 (FIGS. 12 and 15) lights whenever power is being supplied to a test unit from its converter and the regulator is within normal operating bounds. It will be off if the logic bus is 5% over or under its normal operating value.

In programming timer controller 52, when the power to check back microprocessor 90 is interrupted, the program which has been entered in memory is lost. A "program lost" alarm monitors the memory for this condition. To reset or clear the program lost alarm, the following keystrokes must be entered from the keyboard display 58 (FIGS. 5 and 15):

| KEYSTROKE | RESPONSE | ENTRY |
|---|---|---|
| 2 | | This directs the fixed program of timer controller 52 to control the S2 or variable program function. |
| SWD | Display will clear and the S2 LED 658 will light. | |
| ON | The "program lost" alarm will reset. | This programs the S2 function ON until reset by the loss of power to the controller 52. |

When the microprocessor 90 is powered up, the internal clock initilizes to Sunday, 1200 hours PM and begins to keep time. The correct day and time is entered from the keyboard display. Anytime the controller date and/or time is to be changed, the following keystroke sequence must be executed on the keyboard display. The time/date setting being entered becomes "current time" when the CLK key is depressed at the end of the keystroke sequence. Errors may be cleared by using the CE (0) key. This clears the entry and the keystroke sequence must be started over form the beginning. Incorrect time may be corrected by entering the correct time using this sequence. Two procedures are available to correct errors as the time is being entered. Errors in DAY and AM/PM entries may be corrected by using the CLK or CE (0) key. When the CLK key is used, the current time will reappear on the display; the CE key clears the display. Errors in entering the time may be cleared using the CE (0) key or by "rolling off" the error. As time digits are entered they are shifted one place to the left with each entry, thus a zero may be entered followed by the correct time. The error will "roll off" the left end of the display.

| KEYSTROKE | RESPONSE | ENTRY |
|---|---|---|
| DAY | The display will indicate the number corresponding to day of week. | Enter the current day. Sunday = 1 Saturday = 7 |
| WK DISP | Display will blank and day LED will light. | The week display keystroke transfers the day code from the numeric display to the day register which lights the appropriate day LED. |
| AM/PM | AM or PM LED will light. | This entry selects the current 12 hour day segment. |
| TIME HOURS TENS HOURS UNITS MINS TENS MINS UNITS | As the time setting is entered, the digits first appear at the right side of numeric display. As successive digits are entered the previously entered digits shift to the left to make way for the digit being entered. | Enter the setting time in the hours tens, hours units, minutes tens, minutes units digit sequence. Eliminate error in the time being entered by entering four zeros "roll off" the error then enter the correct time. 24 hour format may be entered, however, the AM/PM entry must be made. |
| CLK | The display will remain unchanged. | The controller 52 begins keeping time from the setting just entered. |

The operation of the automatic powerline carrier channel test is controlled by the program stored in the memory of microprocessor. When the test unit is powered up the memory is cleared thus a new program must be entered. Changing the program also requires the existing program be deleted and new instructions entered into memory. The following keystroke listings are used to enter a channel test program through the keyboard display 102. Two separate sets of instructions are required when days, such as weekends, are to be deleted from the test program. The first set of instructions, enters a program which will test all seven days of the week. A second set, is used to delete selected days from the everyday routine. Two keystroke sequences are acceptable for entering programs. The long sequence is easier to enter. A shortened sequence may also be used to enter any program set. An alternative to programming an everyday test routine and deleting days when testing is not to take place is to enter the program one day at a time. Either method may be used, however, the everyday program sequence takes fewer steps when only two or three days of the week have to be deleted. When the channel test is to be initiated from alternate ends of the line on alternate days, some programming steps may be saved by entering the program for only those days when the test is to occur.

To enter a program one day at a time, the same keystroke sequence is employed as in the everyday sequence, but the desired test day is substituted in place of the everyday entry. The display responses will be the same with the exception of day light emitting diodes (LED's). When displayed day code is transferred to the day display with week display keystroke, only the selected day LED will light instead of all seven of the LED's as occurs when the everyday code is entered. Use of the shortened keystroke sequence can simplify the entry of a one day at a time test sequence. Errors may be corrected before they are entered in the memory by depressing the CE key. This clears the display and allows the keystroke sequence to be re-entered. A complete keystroke sequence must be entered in this case. Once an error has been entered into memory, the program must be deleted and re-entered. Changes in the program are also made this way.

The following keystroke sequence enters a program in the controller memory which starts and ends an automatic channel test sequence in the master mode at the selected time of day. Channel test operation is controlled by program instructions directing the S1 function of the controller. S1 is programmed to turn ON at the selected time to start the test sequence and OFF one minute later to end the sequence:

| KEYSTROKE | RESPONSE | ENTRY |
|---|---|---|
| 1 | The number 1 will appear to the right side of the display. | This directs the instruction being entered to the controller S1 (test) function which controls the carrier test. |
| SW DISP | The display will blank the S1 LED will light. | The Switch Display keystroke transfers the display code from the numeric display to the switch register and displays this on the Switch LED'S. |
| EDAY | The number 0 will appear in the right side of the display. | The everyday entry causes the S1 function programmed to occur everyday of the week. |
| WK DISP | The display will blank and all seven day LED'S will light. | The Week Display keystroke transfers the day code from the numeric display to the day register and lights the appropriate day LED'S. |
| AM/PM | The AM or PM LED will light. | The AM or PM entry selects the desired time of day. |
| TIME HOURS TENS HOURS UNITS MINS TENS MINS UNITS | As the program time entered the digits first appear at the right side of the display. As successive digits are entered the previously entered digits shift one place to the left to make way for the digit being entered. | Enter the time of day the channel test is to start. Time is entered in hours tens, hours units, minutes tens, minutes units digit digits shift one place sequence. Eliminate errors in the time entires by entering four successive zeros to "roll off" the error then reenter the correct time. |

The display is checked for the correct time, function, day, and switch. At this point the current entry may be cancelled using the clear entry (CE) keystroke and re-entered. Once the ON keystroke is entered, this entry becomes part of the program stack and cannot be changed without deleting the entire program for S1.

| | | |
|---|---|---|
| ON | The ON LED will light. | All the program entries to turn on the S1 function at the selected time are now complete. |

These instructions are now stored in memory.

| | | |
|---|---|---|
| CLK | The current time and day will appear on the display. | This ends the programming sequence. |

The channel test sequence must now be programmed to end one minute after the start time. This is accomplished by programming the S1 function to turn OFF one minute after it was programmed ON as is accomplished as follows.

| KEYSTROKE | RESPONSE | ENTRY |
|---|---|---|
| 1 | The number 1 will appear in the display. | The S1 function is selected for programming. |
| SW DISP | The S1 LED will light and the display will blank. | The Switch Display keystroke transfers the switch code from the numeric display to the switch LED'S. |
| EDAY | The Number 0 will appear on the display. | This programs the S1 function to occur everyday of the week |

-continued

| KEYSTROKE | RESPONSE | ENTRY |
|---|---|---|
| WK DISP | The display will blank and the day LED's will light. | The Week Display keystroke transfers the day code from the numeric display to the day register and lights the appropriate day LED'S. |
| AM/PM | The AM or PM will lights. | The AM or PM entry selects the time of day to be programmed. |
| TIME<br>HOURS TENS<br>HOURS UNITS<br>MINS TENS<br>MINS UNITS | As the program time is entered the digits first appear at the right side of the display. As successive digits are entered the previously entered digits shift one place to the left to make way for the digit being entered. | Enter the time of day the channel test is to end. This time should be one minute later than the starting time. Time is entered in the hour tens, hour units, minutes, tens, minutes units sequence in 12 hour format. Eliminate errors in time entries by entering four successive zeros to "roll off" the error. Then re-enter the correct time. |

The display is checked for the correct time, function, day, and switch. At this point the current entry may be cancelled using the clear entry (CE) keystroke and re-entered. Once the OFF keystroke is entered this entry becomes part of the program stack and cannot be changed without deleting the entire program for S1.

| KEYSTROKE | RESPONSE | ENTRY |
|---|---|---|
| OFF | The OFF LED will light. | This programs the S1 function off at the entered time. |

These instructions are now entered in memory.

| CLK | Current time will appear on the display. | The program entry is completed. |

This sequence produces a program which occurs everyday. Selected days may be deleted from this program using additional program steps.

Once an everyday test routine has been entered into the program stack, selected tests may be deleted from the routine. This is accomplished by entering an OFF instruction for the S1 program timed to coincide with the ON time of the everyday instruction ON time. In the microprocessor 90, the last instruction in the stack takes precedences, thus the OFF condition will prevail. The following keystroke sequence will delete one test from an everyday routine.

| KEYSTROKE | RESPONSE | ENTRY |
|---|---|---|
| 1 | "1" will appear in the display. | This selects the S1 function. |
| SW DISP | The display will blank and the S1 LED will light. | The Switch Display keystroke transfers the display code to the switch register and lights the appropriate switch LED. |
| DAY | The Day code number will appear in the display. | Enter the day on which the test is to be deleted. |
| WK DISP | The display will blank and the appropriate day LED will light. | The Week Display keystroke transfers the day code from the numeric display to the day register. |
| AM/PM | The AM or PM LED will light. | Enter the appropriate half day. |
| TIME<br>HOURS TENS<br>HOURS UNITS<br>MINS TENS<br>MINS UNITS | As the program time is entered the digits appear at the right side of the display. As successive digits are entered the digits are shifted one place to the left to make way for the digit entered. | Enter the time of day programmed to turn on the S1 function in the Everyday instruction set. Time is entered in hours tens, hours units, minutes tens, minutes units digits sequence. Eliminate errors by entering four successive zeros to "roll off" the error then re-enter the correct time. |

The display is checked for the correct day, time, and switch. At this point the current entry can be cancelled using the clear entry (CE) keystroke and re-entered. Once the OFF keystroke is entered this entry becomes part of the program stack and cannot be changed without deleting the entire program for S1.

| OFF | The OFF LED will light. | All program entries are now complete. These instructions will delete the programmed day and time from the everyday routine. |
| CLK | Current time will appear on the display. | |

Under some conditions the sequence of keystrokes may be shortened to simplify programming. This sequence may be used when a series of on and off commands are to be entered for the same switch and day (including day code zero). The sequence is as follows:

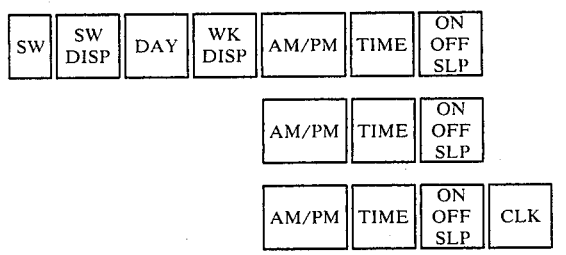

Note that the first set of keystrokes is the same as any other single entry except the clock keystroke is not performed. Instead, the next entry for the same switch and day (including everyday) may be entered beginning with the AM/PM keystroke. When using the shortened keystroke sequence the first four entries are made only once for the series of instructions. This, as all others, terminates when the CLK keystroke is made. Errors in time entries may be corrected by "rolling off" the error with four successive zeros followed by the correct time. Other errors such as AM/PM or ON/OFF/SLP are corrected using the clear entry (CE) command.

The respond cycle provides a short period of WAIT time which follows the transmission of a test sequence SET-UP signal from a master unit. WAIT times allows the channel to settle at the termination of the SET-UP signal. It precedes the transmission of a unit responding. Normal WAIT time is set from 0.1 to 0.9 seconds but it can be extended from 1 to 9 additional seconds, in one second increments, by control actions of microprocessor controller 90. EXTENDED WAIT time is intended primarily to allow two or more respond units to be coordinated for testing channels on multi-ended lines. During EXTENDED WAIT time one unit transmits while the remaining units wait. This allows the respond sequences to be staggered so that they are measured individually by the master test unit conducting the test. EXTENDED WAIT time must be programmed into the programmable timer controller. It may be turned on at all times or it may be turned on and off in a timed program. When the controller is initialized on power-up, EXTENDED WAIT time will be off and no program will be stored to control it. Whenever EXTENDED WAIT time is on, the seconds digit for the WAIT time counter will be enabled which allows it setting on the pre-set switches to be entered into the WAIT time counter.

The following keystroke sequence will turn EXTENDED WAIT time on or off without regard to day or time.

| KEYSTROKE | RESPONSE | ENTRY |
| --- | --- | --- |
| 4 | The switch code "4" will appear on the display. | This selects switch "4" of the PTC for program control which controls Extended Wait Time. |
| SW DISP | The numeric display will blank and S4 LED will light. | This transfers the switch code to the switch register. |
| ON/OFF | EXTENDED WAIT Time will be ON/OFF as entered and the numeric display will indicate current time. | The control entry is now complete. It will remain in this state until altered by another direct control command or by a power-up initialization. |

EXTENDED WAIT time may be controlled by a set of ON/OFF timed instructions entered in the controller program stack. This allows EXTENDED WAIT time to coordinate with different master units on a three ended line. It is normally turned on one-half hour preceeding the time of test from a remote master and off one half hour after the scheduled test. This margin allows the controller times to drift substantially and remain coordinated.

As discussed above, the static powerline carrier channel test units may be programmed to annunciate the failure of a test to occur that is to be initiated from another test unit acting as a master unit. This is called the remote master test. To perform the remote master test a set of timed ON/OFF instructions are programmed into the controller which turns the S3 function on before the anticipated test and off following the test. A suitable margin is provided to allow some skewing of the different test unit clocks. Normally a half-hour margin will be specified. A typical set of ON/OFF instructions for a remote master test will specify the S3 function be turned on one half hour before a test is to be initiated from the remote end of the line and that it be turned off one half hour later. This must occur only on days when remote master tests are programmed. At the end of the remote master test (S3) time window an annunciator point 638 will become active if a respond sequence of the local test unit has not occurred. This will also light the amber sequence fail indication light 636. The annunciator point may be strapped to monitor station alarm or both outputs as shown in FIG. 11. A sequence failure may be reset using reset panel switch 284.

The following set of keystrokes entered through the keyboard display 102 will enter a remote master test. The program is entered to coordinate with the remote master. It may be entered as an everyday sequence with day deleted where a remote master test is not programmed or it may be entered one day at a time.

| KEYSTROKE | RESPONSE | ENTRY |
| --- | --- | --- |
| 3 | "3" will appear on the numeric display. | This enters the S3 selection code which controls the Remote Master Test. |
| SW DISP | The display will clear and the S3 LED will light. | This transfers the S3 selection to the function register. |
| EDAY | The Number 0 will appear on the numeric display. | This is the Everyday code. |
| WK DISP | The numeric display will blank and all day LED's will light. | The day register is now loaded. |

| KEYSTROKE | RESPONSE | ENTRY |
|---|---|---|
| AM/PM | The AM or PM LED will light. | Select the appropriate period of day to correspond with the test time programmed at the remote master. |
| TIME HOURS TENS HOURS UNITS MINS TENS MINS UNITS | As the program time is entered the digits appear at the right side of the display. As successive digits are entered the digits are shifted one place to the left to make way for the digit entered. | Enter the time of day programmed to turn on the S4 function in the Everyday instruction set. Time is entered in hours tens, hours units, minutes tens, minutes units digits sequence. Eliminate errors by entering four successive zeros to "roll off" the error then re-enter the correct time. |

The display is then checked for the correct time, day, switch, and function indications. At this point an error may be corrected by using the clear entry (CE) key and the correct instructions re-entered. Once stored in the instruction stack the entire instruction set must be deleted and re-entered to correct an error.

| KEYSTROKE | RESPONSE | ENTRY |
|---|---|---|
| ON | The ON LED will light. | All program entries are now complete. |
| CLK | Current time will be displayed. | |

This keystroke sequence is repeated to turn S3 off at a time on half hours after the remote master test is expected. This will produce an everyday test thus "No-Test" days must be deleted from the program. Use the following keystroke sequence to delete test days. If more than one remote master test is programmed for each day, then each program time must be individually deleted for each day.

To delete a test, a set of instructions is entered which directs the remote master function S3 to be OFF at exactly the same time as the ON instruction of the Everyday routine previously entered on those days which are to be deleted. Microprocessor 90 assumes the state directed by the last instruction in the stack.

| KEYSTROKE | RESPONSE | ENTRY |
|---|---|---|
| 3 | The number 3 will appear in the display. | This selects the S3 function which controls the remote master test. |
| SW | The display will blank and the S3 LED will light. | The S3 function is now transferred to the function register. |
| AM/PM | The AM or PM LED will light. | Select the appropriate half day interval. |
| TIME HOURS TENS HOURS UNITS MINS TENS MINS UNITS | As the program time is entered the digits appear at the right side of the display. As successive digits are entered the digits are shifted one place to the left to make way for the digit entered. | Enter the time of day being programmed to turn off the S3 function in the instruction set. Time is entered in hours tens, hours units, minutes tens, minutes units sequence. Eliminate errors by entering four successive zeros to "roll off" the error then re-enter the correct time. |

The day, time, function and state are checked indicated on the display. If an error has occurred it may be corrected using the clear entry (CE) key to delete the entry and re-entering the instruction. Once the instruction is entered in the stack the entire set must be deleted and re-entered. At this point the instruction may be entered in the stack by the OFF keystroke or a shortened keystroke entry sequence may follow to delete additional times from the same day's time routine. In the shortened keystroke sequence only the time and state need be entered to create a second instruction. An error may be corrected using the clear entry (CE) key but the entire sequence must be re-entered from the beginning. The OFF keystroke will enter the entire series of instructions in the stack.

| KEYSTROKE | RESPONSE | ENTRY |
|---|---|---|
| OFF | The OFF LED will light. | The OFF state is entered for S3. |
| CLK | Current time will be delayed. | |

This sequence of keystroke is repeated, changing the day and times, to delete the days required from the Everyday routine.

Program instructions entered into the microprocessor 90 memory may be deleted using clear memory commands. These are entered from the keypad display using keystroke sequences ending with CLR. There are three options for deleting programs. Depressing the CLR MEM key will delete all programs and set all S-functions to the OFF state. The following keystrokes will delete the program for a single selected S-function.

| KEYSTROKE | RESPONSE | ENTRY |
|---|---|---|
| 1,2,3,4 | The function number will appear in the display | Enter the number of the "S" function to be deleted. |
| SW DISP | The display will blank and the selected S-function LED will light. | This transfers the selected S-function to the function register. |
| CLR MEM | Current time will reappear on the display. | The CLR MEM keystroke will clear the programs of the selected S-functions. |

The following keystrokes will delete programs as selected by the day on which they occur. This sequence deletes all S-function ON/OFF commands for the selected day, including those entered as Everyday if so commanded:

| KEYSTROKE | RESPONSE | ENTRY |
|---|---|---|
| DAY | The Day code will appear in the display. | Enter the day for which programs are to be deleted. Everyday is considered a weekday, the same as any other. |
| WK DISP | The display will blank and the selected day LED will light. | This transfers the selected day to the day register. |
| CLR MEM | Current time will reappear on the display. | All programs for the selected day are now deleted. |

The keypad-display can be used to display programs stored in memory. Displaying the stored instruction will not alter them.

| KEYSTROKE | RESPONSE | ENTRY |
|---|---|---|
| 1,2,3,4 | The selected S-function will appear in the display. | Enter the S-function whose program is to be viewed. |
| SW DISP | The display will blank and selected S-function LED will light. | This transfers the S-function selection to the function register. |
| SW DISP | The first instruction in the stack will appear in the display as entered. This includes S-function day, On/OFF/SLP, AM/PM, and the time the action is to occur. | Depressing the SW DISP key the second time brings up the first entry. |
| SW DISP | The display will blank. | |
| SW DISP | The next instruction in the stack will be displayed as entered. This includes S-function, day, ON/OFF/SLP, AM/PM, and the time the action is to occur. | Depressing the SW DISP key the second time brings up the instruction from the stack. |

The sequence continues using two successive SW DISP keystrokes to scroll the instructions from memory to the display. When display remains blank following the second SW DISP keystroke, the end of the stack has been reached. Two more successive SW DISP keystrokes will bring the first instruction in the stack to the display again and start the scroll again. When the keypad-display is no longer to be used to display program instructions, current time can be returned to the display by depressing the CLK key.

To display the programs by day the following keystrokes are utilized:

| KEYSTROKE | RESPONSE | ENTRY |
|---|---|---|
| DAY | The Day code will appear in the display. | Enter the day whose programs are to be reviewed. |
| SW DISP | The display will blank and the selected day LED will light. | This transfer the day selected to the day register. |
| SW DISP | The first instruction in the stack will appear in the display as entered. This includes S-function, day, ON/OFF/SLP, AM/PM, and the time the action is to occur. | Depressing the SE DISP key a second time brings up the first memory entry. |

This sequence is continued using two successing SW DISP keystrokes to scroll the instructions from memory to the display. When display remains blank following the second SW DISP keystroke, the end of the stack for the selected day has been reached. Two more successive SW DISP keystrokes will bring up the first instruction in the stack again and start the scroll again.

In the foregoing there has been illustrated and described in detail the method and structure for testing electrical power line operability.

For simplicity, the basic requirements of the method are reviewed. A signal applied at test unit 12 to line segment 16 is received by receiver 48 at test unit 14, and actuates transmitter 46 which applies a second signal to line segment 16. This second signal is received by receiver 44 of test unit 14, and receipt and recognition of this second signal indicates that line segment 16 is operable.

Since the first signal is applied to line segment 16 it is also received by receiver 44 at station 12. This of course requires differentiation at the station 12 between signals applied to line segment 16 by transmitters 42 and 46. This is accomplished as disclosed herein by providing for duration of the second signal applied by transmitter 46 beyond termination of the first signal applied by transmitter 42. Station 12 is programmed to monitor duration of signal receipt, and signal receipt after termination of operation of transmitter 42 establishes operability of the line segment 16.

Where one or more additional line segments are connected in series to the first segment, each provided with signal receivers and transmitters programmed for operation of their transmitters for intervals of predetermined duration operability of line segments tested successively is indicated by the overall duration of signal receipt by the receiver 44 at station 12.

Although the specific embodiment of the static programmable powerline carrier channel test structure of the invention and modifications thereof have been disclosed above, it will be understood that other embodiments and modifications are contemplated. It is the intention to include all embodiments and modifications as are defined by the appended claims within the scope of the invention.

The invention claimed is:

1. A system for testing condition of an electrical power line carrier channel between at least first and second separated stations on said line, said system comprising first and second test apparatus respectively positioned at said stations, each said test apparatus including signal transmitting and receiving means connected to said power line, and microprocessor-based control means coupled to said transmitting and receiving means for selectively transmitting signals to and receiving signals from other said test apparatus connected to said power line, one of said control means including means for selectively initiating a test sequence, means responsive to said initiating means for applying a first signal of preselected first time duration to said power line through associated said transmitting means at one of said first and second stations, another of said control means including means for monitoring said first signal through associated said receiving means at the other of said stations by comparing time duration thereof to a first preselected time interval, and means for applying a second signal of second preselected time duration to said power line through associated said transmitting means at said other station following receipt of said first signal when time duration of said first signal is greater than said first time interval, said one of said control means further including means for monitoring said second signal through associated said receiving means at said one of said stations by comparing time duration of said second signal to a second preselected time interval, and means for indicating an alarm condition at said one station when time duration of said second signal is less than said second preselected time interval, each of said microprocessor-based control means including means for selectively structuring said control means as said one control means or said other control means, such that said test sequence may be selectively initiated from either of said first and second stations.

2. The system set forth in claim 1 wherein said one of said control means includes means for automatically initiating said test sequence at third preselected time intervals, and wherein said other of said control means further includes means responsive to absence of said first signal within said third preselected time interval to indicate an alarm condition.

3. The system set forth in claim 2 for testing condition of said power line carrier channel between first, second and third separated stations on said line, said system further comprising third test apparatus at said third station including third signal transmitting and receiving means connected to said power line, and third microprocessor-based control means coupled to said third transmitting and receiving means for selectively transmitting signals to and receiving signals from other said apparatus connected to said line, said third control means including means for monitoring said first signal through said third receiving means by comparing time duration thereof to a fourth preselected time interval, means for delaying operation at said third station a preselected fifth time interval at least equal to said second time duration, and means for applying a third signal of third time duration through said third transmitting means to said power line at said third station after said fifth time interval and when said first time duration is greater than said fourth time interval, said one of said control means including means for monitoring said third signal by comparing time duration thereof to said second preselected time interval, and means for indicating an alarm condition when said time duration of said third signal is less than said second preselected time interval, each of said control means including means for selectively structuring said control means as said one, said other and said third control means, such that said test sequence may be selectively initiated from any said station on said power line.

4. The system set forth in claim 3 wherein each said control means includes means for selectively setting all of said time intervals and said time durations.

5. The system set forth in claim 4 wherein said selectively-setting means comprises an alphanumeric keypad, and means for selectively entering data from said keypad into said microprocessor-based control means.

* * * * *